(12) United States Patent
Peddi et al.

(10) Patent No.: US 11,611,305 B2
(45) Date of Patent: Mar. 21, 2023

(54) BANDWIDTH-PARTITIONING HARMONIC REGULATION FOR IMPROVED ACOUSTIC BEHAVIOR OF AN ELECTRIC DRIVE SYSTEM

(71) Applicant: GM GLOBAL TECHNOLOGY OPERATIONS LLC, Detroit, MI (US)

(72) Inventors: Vinod Chowdary Peddi, Shelby Charter Township, MI (US); Anno Yoo, Rochester, MI (US); Brent S. Gagas, Ferndale, MI (US); Song He, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 397 days.

(21) Appl. No.: 17/078,346

(22) Filed: Oct. 23, 2020

(65) Prior Publication Data

US 2022/0131490 A1     Apr. 28, 2022

(51) Int. Cl.
*H02P 23/30*     (2016.01)
*H02P 6/10*      (2006.01)
*H02K 7/00*      (2006.01)
*H02P 27/06*     (2006.01)
*H02P 23/04*     (2006.01)

(52) U.S. Cl.
CPC .............. *H02P 23/30* (2016.02); *H02K 7/006* (2013.01); *H02P 6/10* (2013.01); *H02P 23/04* (2013.01); *H02P 27/06* (2013.01)

(58) Field of Classification Search
CPC ................................ H02P 27/06; H02P 21/18
See application file for complete search history.

(56) References Cited

U.S. PATENT DOCUMENTS

| | | | |
|---|---|---|---|
| 7,952,308 B2 | 5/2011 | Schulz et al. | |
| 2011/0241578 A1* | 10/2011 | Kim | B60L 50/13 318/400.02 |
| 2014/0225548 A1* | 8/2014 | Xu | H02P 21/13 318/400.33 |
| 2016/0013738 A1* | 1/2016 | Hozuki | H02P 21/20 318/400.02 |
| 2016/0134218 A1* | 5/2016 | Yamaguchi | B60L 15/025 318/139 |

(Continued)

*Primary Examiner* — Zoheb S Imtiaz
(74) *Attorney, Agent, or Firm* — Quinn IP Law

(57) ABSTRACT

A method for controlling operation of a rotary electric machine includes receiving, via a bandwidth-partitioning harmonic compensation regulator (HCR) of a controller, a commanded torque and rotational speed of the electric machine, and calculating, via the HCR in response to enabling conditions, a dq harmonic compensation current and a dq harmonic compensation voltage for one or more predetermined harmonic orders using the commanded torque and the rotational speed. The harmonic compensation current and voltage cancel torque ripple and current ripple in the one or more predetermined harmonic orders. The method may include injecting an acoustic tone at a predetermined harmonic order. The method additionally includes adding the dq harmonic compensation current and voltage to a dq current and voltage command, respectively, to generate adjusted dq current and voltage commands. The electric machine is then controlled using the adjusted dq current and voltage commands.

20 Claims, 10 Drawing Sheets

(56) References Cited

U.S. PATENT DOCUMENTS

2016/0200355 A1\* 7/2016 Mori .................. H02P 21/22
                                                    180/446
2018/0127022 A1\* 5/2018 Bakos ................ B62D 5/0463

\* cited by examiner

BANDWIDTH-PARTITIONING HARMONIC REGULATION FOR IMPROVED ACOUSTIC BEHAVIOR OF AN ELECTRIC DRIVE SYSTEM

INTRODUCTION

Rotary electric machines are used in vehicle powertrains and other electric drive systems to deliver motor torque to a coupled load. In a radial flux-type electric machine having a rotor and a wound stator, the rotor is circumscribed by the stator and separated therefrom by a radial airgap. The rotor and an integrally-connected rotor shaft rotate in unison when the stator's field windings are sequentially energized by a high-voltage power supply, typically in the form of a power inverter and a high-voltage battery pack. Motor torque generated by the energized electric machine is transmitted to the coupled load to perform work, e.g., generating electricity, cranking and starting an internal combustion engine, and/or powering one or more road wheels, propeller blades, drive belts, or other coupled mechanical loads depending on the application.

Spatial flux harmonics and power inverter non-linearities may cause an electric drive system to experience periods of undesirable torque ripple and current ripple. The collective ripple phenomena, which are often produced by mechanical design factors such as stator-rotor misalignment, tend to interact with driveline dynamics to produce undesirable driveline vibrations and other noise, vibration, and harshness (NVH) effects. Torque ripple in particular refers to periodic variations in a motor's total output torque, with the total output torque being inclusive of the motor's average generated output torque and an associated torque ripple. In a similar vein, current ripple describes rotation-induced pulsations in a motor drive current feeding into the above-noted stator field windings. Current ripple tends to exacerbate the above-noted NVH effects of torque ripple due to factors such as current ripple-induced electromagnetic interference and acoustic noise.

SUMMARY

Disclosed herein are systems, associated control logic, and methods for controlling the operation of a rotary electric machine within an electric drive system, with the intention of reducing or ideally cancelling out multiple harmonic orders of the above-described torque ripple and current ripple. Additional targeted benefits include a reduction in acoustic noise and other mechanical noise, vibration, and harshness (NVH) effects or, if desired, an introduction of a particular acoustic tone in a particular harmonic order to distract from or compliment an existing harmonic order. The present control solutions are therefore highly customizable to regulate harmonic treatment within the electric drive system in an application-suitable manner.

The teachings set forth herein provide for bandwidth partitioning of a harmonic regulator, i.e., a logic block of a resident controller that ultimately controls the generation and delivery of voltage commands to the electric machine. The solutions described herein also enable a selective injection of a harmonic tone at predetermined harmonic orders, as noted above, for regulating acoustic behavior of the electric drive system. In particular, the present teachings employ bandwidth-partitioning of harmonic regulators in either a current domain or a magnetic flux domain to provide a configurable control topology, i.e., one which may be tuned to address one or more higher order harmonics at a given torque-speed operating point as set forth herein.

Motor control systems in general have traditionally provided relatively weak attenuation of higher-order harmonics and related torque disturbances, and usually operate at low machine rotation speeds. For instance, typical electric drive control solutions may employ a synchronous frame filter in combination with a proportional-integral/PI regulator operating in a low bandwidth, for the purpose of performing harmonic current regulation without comprehending the variation of machine parameters in the harmonic reference frame. Additionally, such approaches attempt to cancel undesirable torque ripple via the transmission of harmonic current commands without comprehending harmonic reference frame variation of flux as a function of output torque.

In contrast, the solutions described in detail herein are intended to operate at much higher machine rotational speeds with the aid of the above-noted bandwidth-partitioning harmonic regulator. As used herein, the term "bandwidth-partitioning" refers to the purposeful allocation of an available bandwidth across multiple different harmonic orders, e.g., $3^{rd}$, $6^{th}$, and/or $12^{th}$ harmonics in an exemplary application. Within the scope of the disclosure, the present bandwidth-partitioning control strategy enables a combination of controllers with different bandwidths and frequency process variations to achieve a higher bandwidth, and to provide higher disturbance rejection properties relative to existing approaches. A result of the bandwidth-partitioning enabled by the present disclosure is the ability to operate phase lag-free with no direct current (DC) component errors.

It is recognized herein that spatial harmonics tend to induce a fluctuation in magnetic flux components along the direct axis (d-axis) and quadrature axis (q-axis) of a rotary electric machine. Dominant fluctuation frequencies usually include a $6^{th}$ order harmonic, although this is not necessarily the case. The present approach therefore enables application-specific tuning of harmonic and acoustic performance to reduce the effects of and/or cancel out the $6^{th}$ order harmonic and/or other targeted problematic harmonic orders, with the disclosed bandwidth-partitioning approach facilitating such harmonic performance tunability.

The present configurable control arrangement in the various embodiments operates as a function of the total output torque and rotational/angular speed of the electric machine, in this instance a high-voltage electric traction motor, with possible operating point-based variation of an injected phase angle to account for the variation of magnetic flux in a harmonic reference frame as a function of load torque. Moreover, the present approach may be used to shape d-axis and q-axis current commands to closely follow a real-time varying torque curve rather than a constant maximum torque per ampere (MTPA) curve in the traditional manner.

Disclosed herein is a method for controlling operation of a rotary electric machine. A particular embodiment of the present method includes receiving, via a harmonic compensation regulator (HCR) logic block of an onboard electronic control unit/controller, a commanded torque and rotational speed of the electric machine. The method includes calculating, via the HCR logic block in response to a set of enabling conditions, a dq harmonic compensation current and a dq harmonic compensation voltage. This is done for predetermined harmonic orders using the commanded torque and rotational speed, with the harmonic compensation current and voltage being configured to cancel out torque ripple and current ripple in the predetermined harmonic orders.

The method further includes adding the dq harmonic compensation current and the dq harmonic compensation voltage to a dq current command and a dq voltage command, respectively, to generate an adjusted dq current command and an adjusted dq voltage command. The method thereafter includes controlling operation of the electric machine using the adjusted dq current command and the adjusted dq voltage command.

The HCR logic block may add together the dq harmonic compensation current for each of the harmonic orders, and the dq harmonic compensation voltage for each of the harmonic orders, in order to generate the harmonic compensation current and the harmonic compensation voltage, respectively.

The method may additionally include generating the dq current command via a torque-to-current logic block of the controller as a function of the commanded torque, the rotary speed, and the DC bus voltage level.

The torque-to-current logic block may be optionally embodied as a lookup table indexed or referenced by the commanded torque, the rotary speed, and the DC bus voltage level.

The electric machine in some embodiments is connected to a traction power inverter module (TPIM), in which case the method includes subtracting an actual dq current of the electric machine from the adjusted dq current command to derive a dq current error value, generating the adjusted dq voltage command via the HCR logic block using the dq current error value, and converting the adjusted dq voltage command into phase current commands. The method thereafter includes providing the phase current commands to the TPIM to energize the electric machine.

The HCR logic block contemplated herein may include a feed-forward harmonic compensation generator (FF HC-GEN) logic block and a harmonic compensation regulator (HC-REG) logic block. The method in such an embodiment may include determining and outputting the dq harmonic compensation current via the HC-REG logic block, determining and outputting the dq harmonic compensation voltage via the HC-REG logic block, and ramping the dq harmonic compensation current via a scaling block of the FF HC-GEN logic block.

The FF HC-GEN logic block in such a configuration may include a current magnitude lookup table configured to provide separate d-axis and q-axis harmonic compensation currents, and a phase injection lookup table configured to provide a harmonic compensation phase adjustment. The FF HC-GEN logic block may also include a null block, with the method including selectively zeroing the separate d-axis and q-axis harmonic compensation currents via the null block as a function of the commanded torque and the rotational speed.

As part of the present method, the HC-REG logic block may include multiple separate control loops for each corresponding one of the harmonic orders, with each of the loops having selectable proportional and integral gain blocks and a frequency correction block. Determining and outputting the dq harmonic compensation voltage via the HC-REG logic block may include calculating a respective harmonic-specific dq harmonic compensation voltage for each of the harmonic orders, and adding together the respective harmonic-specific dq harmonic compensation voltages to thereby generate the dq harmonic compensation voltage.

Some embodiments of the method may include injecting an audible tone at a predetermined harmonic order using the HCR logic block.

The HCR logic block may optionally operate in the magnetic flux domain. In such an embodiment, the method may include translating the dq harmonic compensation current from the FF HC-GEN logic block into a dq harmonic compensation flux, and calculating a dq harmonic compensation flux error value. Additional actions taken as part of the method may include transmitting the dq harmonic compensation flux error value to the HF-REG logic block, as well as determining and outputting the dq harmonic compensation voltage via the HC-REG logic block using the dq harmonic compensation flux error value.

An electric drive system is also disclosed herein. In a possible configuration, the electric drive system includes a battery pack, a rotary electric machine coupled to a load, a TPIM connected to the battery pack and the rotary electric machine, and a controller in communication with the TPIM. The controller is configured to execute the method summarized above.

The above-noted and other features and advantages of the present disclosure will be readily apparent from the following detailed description of the embodiments and best modes for carrying out the disclosure when taken in connection with the accompanying drawings and appended claims.

DETAILED DESCRIPTION

Figure 1:
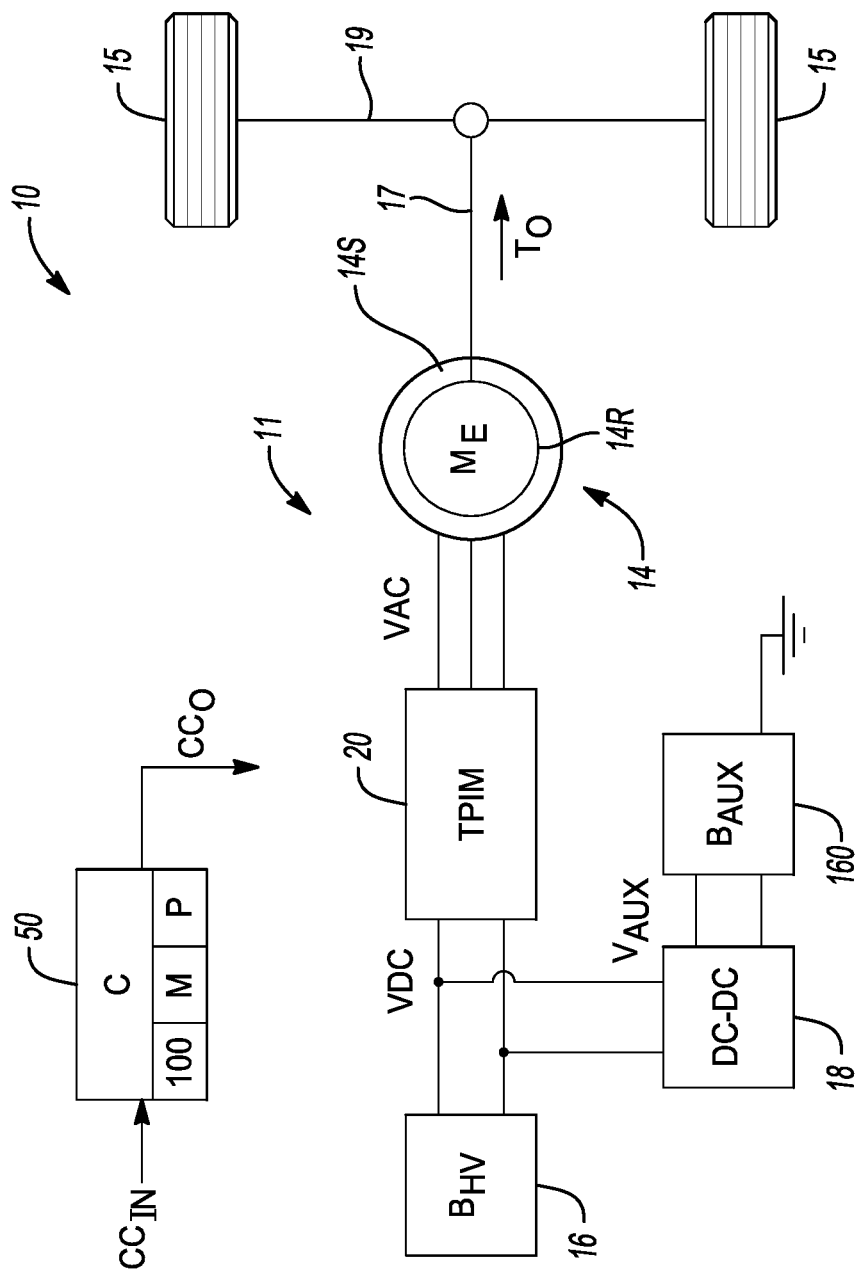
FIG. 1 is a schematic illustration of an exemplary motor vehicle having an electric drive system and a controller configured to execute a method as set forth herein.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Referring to the drawings, wherein like reference numbers refer to like components, FIG. 1 schematically depicts a motor vehicle 10 having an electric drive system 11 configured as set forth herein. The electric drive system 11 includes a rotary electric machine ($M_E$) 14, the operation of which is regulated and controlled in real time by control signals (arrow CCo) from an onboard controller (C) 50. Instructions 100 for implementing the control logic 50L, 150L, or 250L described below with reference to FIGS. 2-13 are recorded in memory (M) of the controller 50 and executed by one or more processors (P) to provide the benefits described herein.

By way of example and not limitation, such benefits include the smoothing of output torque production and attenuation of acoustic noise during ongoing operation of the electric drive system 11. The controller 50 achieves such ends via harmonic regulator bandwidth-partitioning as described below, with a targeted cancellation of multiple predetermined torque and current ripple harmonic orders, as well as purposeful variation of an injection phase angle. Other advantages of the present bandwidth-partitioning control scheme include the ability to selectively inject a predetermined acoustic tone at a particular harmonic order. In the motor vehicle 10 of FIG. 1, for instance, one may introduce an audible sound at a lower harmonic order, e.g., a $1^{st}$ or $3^{rd}$ harmonic order, to acoustically distract an operator of the motor vehicle 10 from acoustic and/or mechanical sounds emanating at another perhaps higher order harmonic, such as a $6^{th}$ or $12^{th}$ harmonic order, and/or to complement another harmonic order produced during torque generating operation of the electric machine 14.

The controller 50 of FIG. 1 may be embodied as one or more electronic control units or computational nodes responsive to input signals (arrow $CC_{IN}$). The controller 50 include application-specific amounts of the memory (M) and one or more of the processor(s) (P), e.g., microprocessors or central processing units, as well as other associated hardware and software, for instance a digital clock or timer, input/output circuitry, buffer circuitry, etc. The memory (M) may include sufficient amounts of read only memory, for instance magnetic or optical memory. The term "controller" as used herein for descriptive simplicity may include one or more electronic control modules, units, processors, and associated hardware components thereof, including the logic 50L, 150L, or 250L depicted FIGS. 2-4, 7, and 8, Application Specific Integrated Circuits (ASICs), systems-on-a-chip (SoCs), electronic circuits, and other hardware as needed to provide the programmed functionality.

Further with respect to the electric drive system 11 shown in FIG. 1, an exemplary embodiment of the electric machine 14 is depicted in which a stator 14S is coaxially arranged with respect to a rotor 14R in a radial flux-type configuration. The stator 14S thus circumscribes the rotor 14R. However, other embodiments of the electric machine 14 may be used within the scope of the disclosure, including axial flux-type machines, and therefore the simplified representative embodiment of the electric machine 14 of FIG. 1 is illustrative of just one possible construction.

In the representative FIG. 1 embodiment, the electric machine 14 is a polyphase/alternating current (AC) traction motor used for generating a total output torque (arrow $T_O$), and for transmitting the same to an output member 17 coupled to the rotor 14R. In the exemplary motor vehicle 10, the output member 17 is connected to one or more road wheels 15 via one or more drive axles 19, with the output torque (arrow $T_O$) powering the rotation of the road wheels 15 for the purpose of propelling the motor vehicle 10. Other possible arrangements may place the electric machine 14 directly on one or more of the individual road wheels 15 or in close proximity thereto, and/or the electric machine 14 may be used at times as an electric generator for electrically powering other components aboard the motor vehicle 10, and therefore the illustrated configuration of FIG. 1 is exemplary of the present teachings and non-limiting.

When the electric machine 14 is configured as a polyphase/AC device as is typical in automotive propulsion applications, energization of corresponding field windings (not shown) of the stator 14S requires the provision of input power from an onboard power supply. To this end, the electric drive system 11 may include a high-voltage battery pack ($B_{HV}$) 16, e.g., a multi-cell rechargeable lithium-ion construction or other suitable battery chemistry. While the term "high-voltage" is relative to typical 12-15V auxiliary/low voltage levels, and thus "high-voltage" may entail voltage levels in excess thereof, exemplary hybrid electric vehicle (HEV) or full battery electric vehicle (BEV) propulsion applications of the types contemplated herein may require the battery pack 16 to have a voltage capability of, for instance, 300V or more.

The battery pack 16 is electrically connected to a traction power inverter module (TPIM) 20 via a high-voltage direct current voltage bus (VDC), with the TPIM 20 in turn being electrically connected to the stator 14S via a high-voltage AC voltage bus (VAC). Although omitted for illustrative simplicity, the TPIM 20 is internally configured and externally controlled via ON/OFF state control of multiple dies of semiconductor switches, with such switches typically embodied as IGBTs or MOSFETs. Thus, a DC input voltage to the TPIM 20 is inverted by switching operation of the TPIM 20 into an AC output voltage for powering the electric machine 14 in its capacity as a propulsion or traction motor. During a regenerative charging event, the TPIM 20 may operate in the opposite sense, i.e., by converting an AC input voltage into a DC output voltage for recharging the constituent battery cells of the battery pack 16.

Other components may be connected to the electric drive system 11, such as but not limited to the illustrated DC-DC converter 18 and an auxiliary battery ($B_{AUX}$) 160. As noted above, auxiliary voltage levels are typically 12-15V, and therefore the DC-DC converter 18 is operable through internal switching operations and signal filtering, as understood in the art, to receive a relatively high DC voltage from the DC voltage bus (VDC) and output a lower auxiliary voltage ($V_{AUX}$) to the auxiliary battery 160. The electric machine 14 is therefore just one of multiple devices requiring the reliable and sustained provision of electrical energy from the battery pack 16 during ongoing propulsion operations of the motor vehicle 10.

Figure 2:
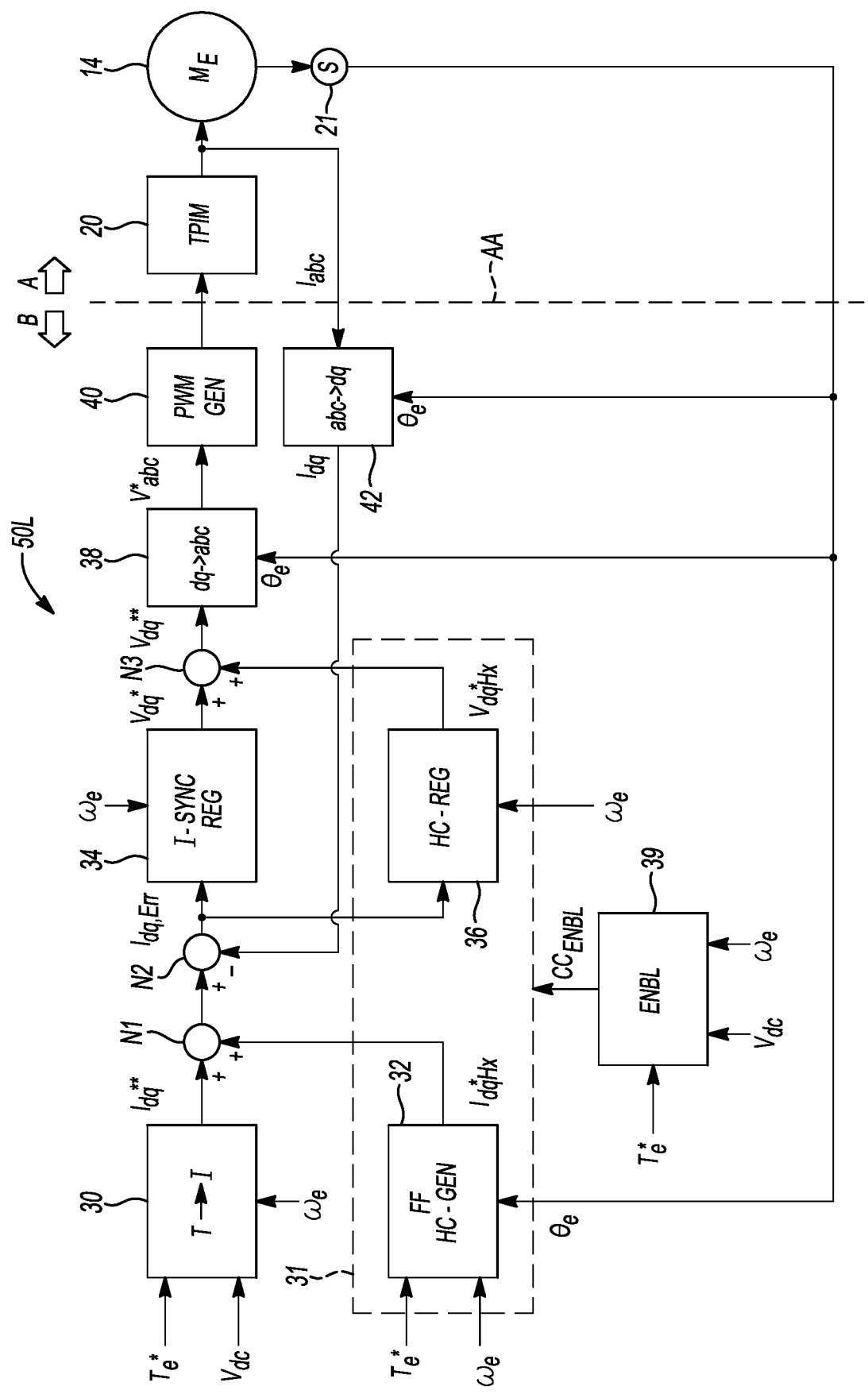
FIG. 2 is a schematic control logic diagram describing an embodiment for implementing the present method.

Referring to FIG. 2, the controller 50 depicted in FIG. 1 may be programmed with control logic 50L suitable for addressing the various undesirable torque ripple-induced and current ripple-induced NVH effects when operating the electric drive system 11, and in particular during a propulsion torque-generating operation of the rotary electric machine 14 of FIG. 1. For simplicity, line AA separates the physical system (arrow A) from a discrete control system (arrow B) embodied by the exemplary control logic 50L. The physical system (arrow A) includes the TPIM 20, the electric machine 14, and a rotary position sensor (S) 21, e.g., an encoder or resolver, with the latter being coupled or positioned with respect to the rotor 14R (FIG. 1) to measure and output a rotary/angular position (arrow $\theta_e$) of the rotor 14R (FIG. 1), as will be appreciated by those skilled in the art. Likewise, FIG. 2 and the remaining Figures denote a command signal using the superscript "*", with the absence of such an asterisk notation representing a measured, calculated, or estimated state value that does not itself necessarily function as a commanded value within the context of the control logic 50L.

The various input signals to the constituent logic blocks of the control logic 50L depicted in FIG. 2 are included in the input signals (arrow $CC_{IN}$) shown in simplified form in FIG. 1. As will be appreciated by those of ordinary skill in the art, a control system for an electric traction motor, e.g., the exemplary rotary electric machine 14, receives a measured, calculated, or estimated angular/rotational speed ($\omega_e$) of the electric machine 14, a commanded torque (arrow $T_e^*$), e.g., as derived by the controller 50 or another control module in response to driver inputs such as an accelerator pedal request, and a magnitude of the DC bus voltage ($V_{dc}$), i.e., the present measured or reported voltage level of the DC voltage bus (VDC) depicted schematically in FIG. 1. The rotational speed ($\omega_e$) of the electric machine 14 may be derived in real time from the measured angular position ($\theta_e$) reported by the position sensor 21, with two signals depicted for illustrative clarity.

A torque-to-current (T→I) logic block 30 of the control logic 50L receives the noted inputs, and thereafter outputs commanded direct axis (d-axis) and quadrature axis (q-axis) current commands, represented in vector notation $I_{dq}^*$ in FIG. 2 for simplicity, to a summation node N1. Downstream of logic block 30, a synchronous current regulator (I-Sync Reg) logic block 34 receives inputs in the form of the above-noted rotational speed ($\omega_e$) of the electric machine 14, as well as an $I_{dq}$ error signal (arrow $I_{dq,Err}$) from a subtraction node N2, with the source and use of the error signal described below. In response, logic block 34 outputs d-axis and q-axis (dq) voltage commands, abbreviated $V_{dq}^*$ in FIG. 2. This output is added via a summation node N3 to a harmonic compensation voltage component $V_{dqHx}^*$ from a harmonic compensation regulator (HC-REG) logic block 36, likewise described in detail below. The output of summation node N3 is an adjusted dq voltage command ($V_{dq}^*$), which in turn is fed into a reference frame conversion logic block 38 ("dq→abc").

As implied by the "dq→abc" notation, the controller 50 of FIG. 1 uses the reference frame conversion logic block 38 to convert the adjusted dq voltage command ($V_{dq}^*$) into a polyphase frame of reference that is relevant to the particular configuration of the electric machine 14. Such phases in a typical three-phase embodiment of the electric machine 14 are nominally referred to in the art as the a, b, and c phases, a convention that is adopted herein for consistency. Logic block 38 thus outputs an abc-phase voltage command ($V_{abc}^*$) to a pulse width modulation generator ("PWM GEN") logic block 40. In response, logic block 40 generates appropriate ON/OFF control signals for changing the corresponding ON/OFF conductive switching states of resident semiconductor switches (not shown) housed within the TPIM 20. The TPIM 20 thereafter passes phase-specific electric drive currents/voltages to the stator 14S (FIG. 1) of the rotary electric machine 14, with such currents for the a, b, and c phases abbreviated $I_{abc}$ in FIG. 2 for clarity and simplicity.

Still referring to the exemplary control logic 50L of FIG. 2, the previously noted measured angular position ($\theta_e$) is then transmitted as an electrical signal to another reference frame conversion block 42 ("abc→dq") that reverses the reference frame transformation function previously performed by logic block 38, i.e., by converting the individual phase currents $I_{abc}$ to corresponding d-axis and q-axis currents ($I_{dq}$). The d-axis and q-axis currents ($I_{dq}$) are then subtracted at node N2 to derive the $I_{dq}$ error signal ($I_{dq,Err}$).

Bandwidth-Partitioning Harmonic Compensation: aspects of the control logic 50L of FIG. 2 are used in state-of-the-art control of electric traction motors, such as the illustrated electric machine 14, and thus are well established in the art. Such functions include performing basic dq and abc reference frame conversions, the use of error signals as feedback control techniques in a PI control architecture, and PWM or other high-speed switching control principles for controlling the ON/OFF conductive state of a semiconductor switch. To such functions, the control logic 50L of the present disclosure adds a bandwidth-partitioning harmonic compensation regulator 31, with the harmonic compensation regulator 31 configured as set forth below to reduce undesirable ripple-induced vibrations and acoustic noise within the electric drive system 11 of FIG. 1.

The bandwidth-partitioning harmonic compensation regulator 31 introduced herein includes two primary functional components: (1) a feed-forward harmonic current generation logic block 32 ("FF HC-GEN"), and (2) the harmonic current regulator logic block 36 briefly noted above. The constituent logic blocks 32 and 36 respectively produce and deliver a harmonic compensation current component ($I_{dq\ Hx}^*$) to summation node N1 and the harmonic compensation voltage component ($V_{dq\ Hx}^*$) to summation node N3, with the components ($I_{dq\ Hx}^*$ and $V_{dq\ Hx}^*$) together cancelling out multiple targeted harmonic orders of current and torque ripple as described below.

With respect to the feed-forward harmonic current generation logic block 32, inputs to logic block 32 include the above-described commanded torque (arrow $T_e^*$) and rotational speed ($\omega_e$) of the electric machine 14. For the specific configuration of the electric machine 14, the controller 50 of FIG. 1 may be programmed with a set of lookup tables indexed or referenced by the commanded torque (arrow $T_e^*$) and rotational speed ($\omega_e$) values. Thus, the operating point-specific value of the harmonic compensation current component ($I_{dq\ Hx}^*$) to apply in a given instance may be extracted from such lookup tables and fed into the summation node N1, or such a value calculated in real-time in other implementations.

Similarly, the harmonic current regulator logic block 36 receives the rotational speed ($\omega_e$) of the electric machine 14, and using another lookup table or calculation, outputs the harmonic compensation voltage component ($V_{dq\ Hx}^*$) to the summation node N3. Operation of the harmonic compensation regulator 31 and its constituent logic blocks 32 and 34 may be selectively enabled by an enablement logic block 39 ("ENBL"), inputs to which include the commanded torque (arrow $T_e^*$), the rotational speed ($\omega_e$), and the DC voltage (Vdc), and outputs from which include an enablement signal (arrow $CC_{ENBL}$). That is, the present teachings allow for a highly-configurable enablement of the control features as a function of torque and speed, with an eye toward the available DC bus voltage. As explained in further detail below, population of the lookup tables or calibration of underlying equations for implementing the harmonic compensation regulator 31 requires an accurate plant characterization and NVH analysis of the electric drive system 11 to determine and fine-tune the magnitudes of the harmonic compensation current and voltage components $I_{dq\ Hx}^{*}$ and $V_{dq\ Hx}^{*}$, respectively, for effective cancellation of torque ripple and current ripple of multiple harmonic orders.

Figure 3:
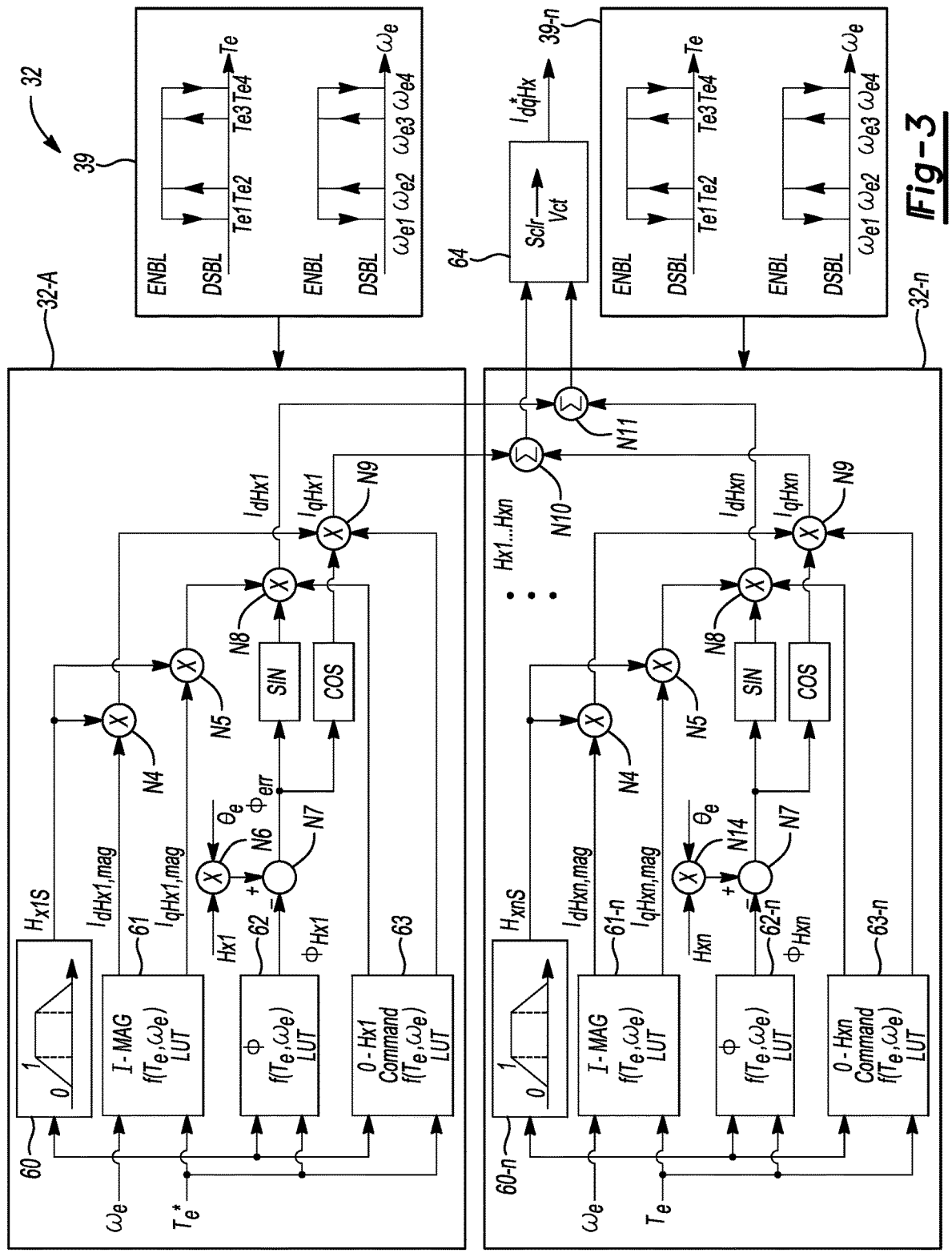
FIGS. 3 and 4 depict a feed-forward harmonic current generation logic block and a bandwidth-partitioning harmonic current regulator logic block, respectively, with both logic blocks being usable as part of the control logic shown in FIG. 2.

Referring now to FIG. 3, an exemplary implementation of the above-noted feed-forward harmonic current generation logic block 32 of FIG. 2 is depicted for an arbitrary number (n) of different harmonic orders. Upon confirmation of enabling conditions for a given harmonic order, e.g., nominally referred to as Hx1 as shown, the harmonic component is multiplied at node N6 by the angular position ($\theta_e$) received from the position sensor 21 of FIG. 1.

The depicted representative topology of logic block 32 thus allows for (n) specific harmonics, i.e., Hx1, . . . , Hxn, each of which may be individually isolated and treated by the controller 50 to fine tune the torque and current ripple cancelling performance, and to provide other benefits as noted below. For example, the harmonic order labeled Hx1 in FIG. 3 may be a $6^{th}$ harmonic in some embodiments, a $12^{th}$ harmonic, or another targeted harmonic order. Thus, logic block 32 may be compartmentalized into multiple sub-blocks 32-A, . . . , 32-n. As each harmonic component may be processed in a similar manner, sub-blocks 32-A and 32-n are schematically identical but for the "-n" notation, as will be appreciated by those skilled in the art. The description of sub-block 32-A thus applies to sub-blocks 32-n, with a separate description of sub-blocks 32-n omitted for simplicity and brevity.

Sub-block 32-A of FIG. 3 may be selectively enabled by the enablement logic block 39, which may be informed by an actual or estimated output torque (Te$_1$, Te$_2$, Te$_3$, Te$_4$) of the electric machine 14 of FIG. 1 and/or by actual or estimated rotational speed ($\omega_{e1}$, $\omega_{e2}$, $\omega_{e3}$, $\omega_{e4}$). Upward arrows in logic block 39 indicate enablement (ENBL), with downward arrows indicating disablement (DSBL) of the depicted calculation functions of sub-block 32-A. Similar enablement logic 39-n may be used for each of the additional harmonic components treated using the control logic 50L of FIG. 2. The depicted output torques $T_{e1}$ and $T_{e2}$ form a mutual pair, as do the output torques $T_{e3}$ and $T_{e4}$.

Thus, a possible embodiment of the enablement logic block 39 may entail enabling sub-block 32-A at the nominal torque Te$_2$ and/or the nominal speed $\omega_{e2}$, but not disabling sub-block 32-A until torque/speed fall below a lower value indicated by torque Te$_1$ and speed $\omega_{e1}$. The same may occur with higher torques Te$_3$ and Te$_4$ and corresponding speeds $\omega_{e3}$ and $\omega_{e4}$, such that tuning of the harmonic treatment and feed-forward adjustments of sub-block 32-A may be achieved for particular torques or speeds at which harmonic-inducted NVH is particularly problematic.

With respect to sub-block 32-A of FIG. 3, a scaling block 60 receives the rotational speed ($\omega_e$) as an input, and then smoothly scales its output to prevent abrupt changes in torque. As will be appreciated, motor control responses to rapid fluctuations in control inputs tend to result in voltage spikes, with user-perceptible driveline vibrations being a potential effect. Scaling block 60 may therefore output a harmonic scaling factor (arrow $H_{x1}S$) having a unitless value of between 0 and 1, with the ramp rate being calibrated based on the desired response.

Implementation of sub-block 32-A also entails the use of lookup tables (LUTs) 61, 62, and 63, with each of the lookup tables 61, 62, and 63 being indexed by the rotational speed ($\omega_e$) and commanded torque (arrow $T_e^*$). Lookup table 61 outputs d-axis and q-axis harmonic compensation components (arrows $I_{dHx1,mag}$ and $I_{qHx1,mag}$, respectively) as a function of torque and speed. These values are scaled by the harmonic scaling factor (arrow $H_{x1}S$) at respective nodes N4 and N5 via multiplication, as indicated by "X" in FIG. 3. Similarly, lookup table 62 outputs a phase injection component $\phi_{Hx1}$ for the harmonic component being treated, e.g., the $6^{th}$ harmonic, which is subtracted from the output of node N6 ($H_{x1}\cdot\theta_e$) at node N7 to produce a phase error signal (arrow $\phi_{err}$). In this manner, lookup table 62 effectively injects a specific acoustic tone, resulting in reduced acoustic noise in the electric drive system 11.

Sub-block 32-A then computes the sine (SIN) and cosine (COS) of the phase error signal (arrow $\phi_{err}$) and thereafter feeds the cosine and sine values to nodes N8 and N9, respectively. The output of node N8 is the d-axis current component needed for correction of the harmonic component Hx1, i.e., arrow $I_{dHx1}$. Similarly, node N9 provides the q-axis current component needed for correcting harmonic component Hx1, i.e., arrow $I_{qHx1}$. The logic flow of sub-block 32-A may be performed for additional harmonic orders if so desired, which would produce (n) additional d-axis and q-axis current components needed for correction of the additional harmonic component Hxn.

Summation nodes N10 and N11, shown within logic block 32-n, may be used to add together the various d-axis and q-axis current components, with the sum then fed into a scalar-to-vector ("Sclr→Vct") calculation logic block 64, which in turn outputs the above-described harmonic compensation current component ($I_{dqHx}^{*}$) shown in FIG. 2. Lookup table 63 ("0-Hx1 Command") acts as a null/zero block by selectively nulling or zeroing the separate d-axis and q-axis harmonic compensation currents as a function of the commanded torque and the rotational speed. Block 63 may be used to prevent correction of a corresponding harmonic at certain combinations of/as a function of rotational speed ($\omega_e$) and motor torque ($T_e$), i.e., by outputting a null/zero value to nodes N8 and N9.

Thus, the exemplary configuration of sub-blocks 32-A through 32-n enables operating point variation of phase angle as a function of torque and speed, for the purpose of torque ripple cancellation. The illustrated logic flow and circuit topology provides the capability of cancelling torque and current ripple of multiple orders, with each harmonic having a corresponding sub-block 32-n as shown for tunability and accurate calibration of a given embodiment of the electric machine 14.

Figure 4:
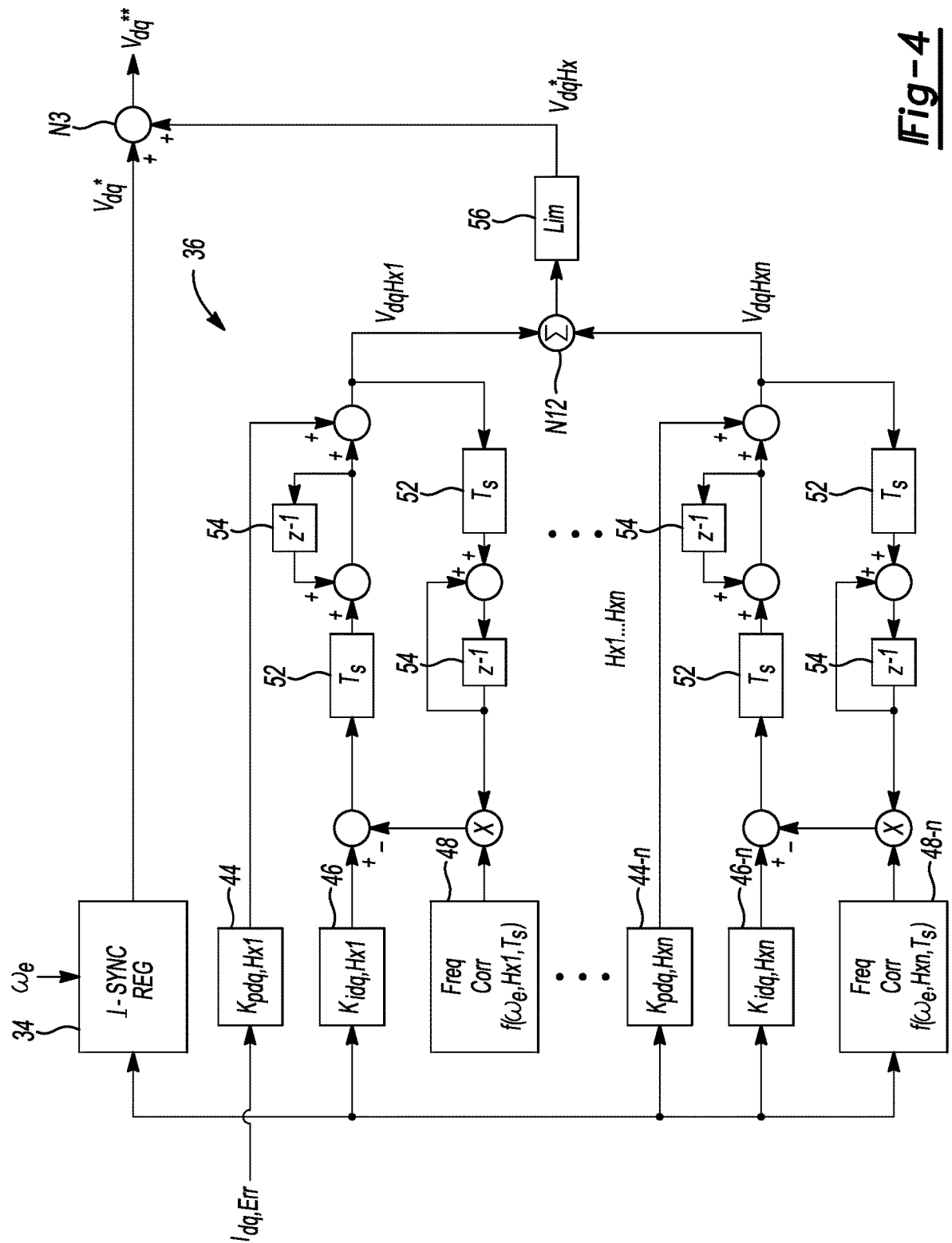

Turning now to FIG. 4, the harmonic current regulator logic block 36 of FIG. 2 may be embodied as shown and used in conjunction with the synchronous current regulator block 34. The illustrated topology allows for harmonic proportional and integral gains $K_{pdq,Hx1}$ and $K_{idq,Hx1}$ to be set at blocks 44 and 46, and also allows for the above-described bandwidth partitioning, i.e., the division of the logic block 36 into separate control loops for corresponding harmonic bandwidths, while maintaining the synchronous current regulator bandwidth.

Within FIG. 4, node N3 outputs the adjusted dq voltage command ($V_{dq}^{**}$) as the sum of the dq voltage command ($V_{dq}^{*}$) from logic block 34 and the harmonic compensation voltage component ($V_{dq\ Hx}^{*}$) from logic block 36, with the latter value possibly limited to a calibrated range by a limiting block 56 ("Lim"), e.g., a bandpass filter. The harmonic current regulator logic block 36 thus enables bandwidth partitioning to provide the ability to individually regulate or treat multiple harmonic orders.

Relative to existing approaches which provide weak attenuation of higher-order disturbances, the control logic topology of FIG. 4 has a higher bandwidth and a corresponding improved disturbance rejection. Higher-order NVH effects may be experienced, for instance, when running the electric machine 14 at higher speeds, with the depicted solution of FIG. 4 used in conjunction with the feed-forward harmonic current generation logic block 32 of FIG. 3 to provide the various NVH-related improvements disclosed herein.

In the depicted embodiment, the above-described error signal ($I_{dq,Err}$) from node N2 of FIG. 2 is fed into logic block 34 and, for each of the (n) different harmonic components to be treated by the controller 50 of FIG. 1, a triplet of processing blocks 44, 46, and 48. FIG. 4 therefore illustrates a discrete PI control setup using calibrated time domain parameter blocks 52 (i.e., having a sampling frequency Ts), and with integrator blocks 54 ($z^{-1}$). Blocks 44 and 56 apply the predetermined proportional or integral gains noted above to the harmonic component being treated, nominally Hx1 (e.g., the $6^{th}$ or $12^{th}$ harmonic in a typical embodiment).

THEORY AND SUPPORT: mathematical/theoretical support for some of the governing principles of the present solutions are provided before proceeding to a discussion of FIGS. 5-13. As will be appreciated, time-varying voltage equations in a typical dq-reference frame for an electric machine may be expressed as follows:

$$V_d(t) = RI_d(t) + \frac{d\lambda_d(t)}{dt} - \omega_e \lambda_q(t) \tag{1}$$

$$V_q(t) = RI_q(t) + \frac{d\lambda_q(t)}{dt} + \omega_e \lambda_d(t) \tag{2}$$

where $I_d$ and $I_q$ are d axis and q axis currents in Amps (A), $V_d$ and $V_q$ are d axis and q axis currents in Volts (V), R is the stator winding resistance in Ohms, and $\lambda_d$ and $\lambda_q$ are d and q axis flux linkages in Wb. Time-varying flux linkages can be written as $$\lambda_d(t) = \lambda_{dx}(t) + \lambda_{dm} \tag{3}$$

$$\lambda_q(t) = \lambda_{qx}(t) + \lambda_{qm} \tag{4}$$

where $\lambda_{dx}$ is d-axis flux linkage caused by stator excitation, $\lambda_{dm}$ is d-axis flux linkage caused by permanent magnet flux or rotor flux, $\lambda_{qx}$ is q-axis flux linkage caused by stator excitation, and $\lambda_{qm}$ is q-axis flux linkage caused by permanent magnet flux or rotor flux.

If the d-axis is assumed to be aligned with the permanent magnet flux linkage $\lambda_m$, then the above equations (3) and (4) can be written as:

$$\lambda_d(t) = \lambda_{dx}(I_d, I_q, \theta_e, T) + \lambda_m = \lambda_d(I_d, I_q, \theta_e, T) \tag{5}$$

$$\lambda_q(t) = \lambda_{qx}(I_d, I_q, \theta_e, T) = \lambda_q(I_d, I_q, \theta_e, T) \tag{6}$$

The time varying flux linkages $\lambda_d$, $\lambda_q$ are thus a function of the d-axis and q-axis currents $I_d$ and $I_q$, motor temperature T, and the angular position $\theta_e$ when the rotor 14R of FIG. 1 is rotating. This captures the saturation and cross coupling effects as well as the effect of spatial harmonics.

The derivative terms can be expanded as follows:

$$\frac{d\lambda_d(t)}{dt} = \frac{\partial(\lambda_d I_d, I_q, \theta_e, T)}{\partial I_d}\frac{dI_d(t)}{dt} + \tag{7}$$

$$\frac{\partial(\lambda_d I_d, I_q, \theta_e, T)}{\partial I_q}\frac{dI_q(t)}{dt} + \frac{\partial(\lambda_d I_d, I_q, \theta_e, T)}{\partial \theta_e}$$

$$\frac{d\lambda_q(t)}{dt} = \frac{\partial(\lambda_q I_d, I_q, \theta_m, T)}{\partial I_d}\frac{dI_d(t)}{dt} + \tag{8}$$

$$\frac{\partial(\lambda_q I_d, I_q, \theta_m, T)}{\partial I_q}\frac{dI_q(t)}{dt} + \frac{\partial(\lambda_q I_d, I_q, \theta_m, T)}{\partial \theta_m}$$

$$\frac{d\lambda_d(t)}{dt} = L_{dd,inc}(I_d, I_q, \theta_e, T)\frac{dI_d(t)}{dt} + \tag{9}$$

$$L_{dq,inc}(I_d, I_q, \theta_e, T)\frac{dI_q(t)}{dt} + \omega_e \frac{\partial(\lambda_d I_d, I_q, \theta_e, T)}{\partial \theta_e}$$

$$\frac{d\lambda_q(t)}{dt} = L_{qd,inc}(I_d, I_q, \theta_e, T)\frac{dI_d(t)}{dt} + \tag{10}$$

$$L_{qq,inc}(I_d, I_q, \theta_e, T)\frac{dI_q(t)}{dt} + \omega_e \frac{\partial \pi_q(I_d, I_q, \theta_e, T)}{\partial \theta_e}$$

where $L_{dd,inc}$ is the d-axis self-incremental inductance in (H), $L_{qq,inc}$ is mutual the q-axis self-incremental inductance, and $L_{dq,inc}$ and $L_{qd,inc}$ are the mutual incremental inductances between d-axis and q-axis showing the cross-coupling nature. Incremental inductances are given as the slopes of tangential lines drawn between the relationship between flux linkage and current. Such variables are essential when designing the controller 50 of FIG. 1, as they are responsible for the transient response.

In contrast to the incremental inductance, apparent inductances are defined as the slope of the linearized relationship between the flux linkage and current, which can be defined as:

$$L_{d,app} = \frac{L_{dd,inc}(I_d, I_q, \theta_e, T)I_d(t) + L_{dq,inc}(I_d, I_q, \theta_e, T)I_q(t)}{I_d(t)} \tag{11}$$

$$L_{q,app} = \frac{L_{dd,inc}(I_d, I_q, \theta_e, T)I_d(t) + L_{dq,inc}(I_d, I_q, \theta_e, T)I_q(t)}{I_d(t)} \tag{12}$$

The terms $\lambda_d(t)$ and $\lambda_q(t)$ can be represented by apparent inductance terms as a part of the process for linearizing the plant.

$$\lambda_d(t) = L_{d,app}(I_d, I_q, \theta_e, T)I_d(t) + \lambda_m \tag{13}$$

$$\lambda_d(t) = L_{q,app}(I_d, I_q, \theta_e, T)I_q(t) \tag{14}$$

From here on, the $L_{dd,inc}$, $L_{qq,inc}$, $L_{dq,inc}$, $L_{qd,inc}$, $L_{d,app}$, $L_{q,app}$, $\lambda_d$, and $\lambda_q$ are implied to be a $f((I_d, I_q, \theta_e, T)$ unless otherwise specified.

By using the relationships derived in equations (9)-(14) set forth above, and by applying these relationships to equations (1) and (2), the voltage equations can be expanded as the following to describe the plant of the electric machine 14 of FIG. 1, considering spatial harmonics, cross-coupling, and saturation effects:

$$V_d(t) = RI_d(t) + L_{dd,inc}(t)\frac{dI_d(t)}{dt} + L_{dq,inc}\frac{dI_q(t)}{dt} + \omega_e \frac{\partial \lambda_d}{\partial \theta_m} - \omega_e L_{q,app}I_q(t) \tag{15}$$

$$V_q(t) = \tag{16}$$

$$RI_q(t) + L_{qd,inc}\frac{dI_d(t)}{dt} + L_{qq,inc}\frac{dI_q(t)}{dt} + \omega_e \frac{\partial \lambda_q}{\partial \theta_m} + \omega_e L_{d,app}I_d(t) + \omega_e \lambda_m$$

The spatial harmonics considered herein are the fluctuations or pulsations in the flux, and can be further broken down into a fundamental component and harmonics where the dominant frequencies are usually $6^{th}$, $12^{th}$ (Hxn) order, but can vary depending on the electric machine configuration.

$$\lambda_{dq}(I_d, I_q, \theta_e, T) = \lambda_{dq}(I_d, I_q, T) + \lambda_{dqHx}(I_d, I_q, Hxn\theta_e, T), \quad (17)$$

$$\text{where } \lambda_{dqHx} = \begin{bmatrix} \lambda_{dHx} \\ \lambda_{qHx} \end{bmatrix} = \begin{bmatrix} \sum_{Hxn=6,12..} \lambda_{dN} \sin(Hxn\theta - \phi) \\ \sum_{Hxn=6,12..} \lambda_{qN} \cos(Hxn\theta - \phi) \end{bmatrix}$$

Figure 10:
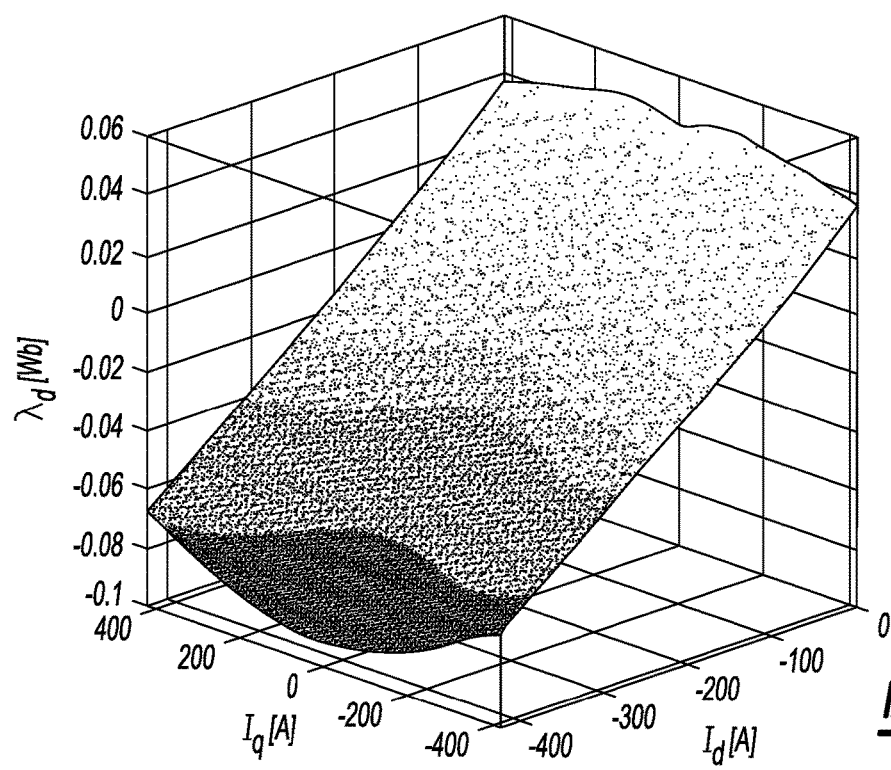
FIGS. 10 and 11 are representative embodiments of flux-to-current lookup tables usable as part of the present method.
Figure 11:
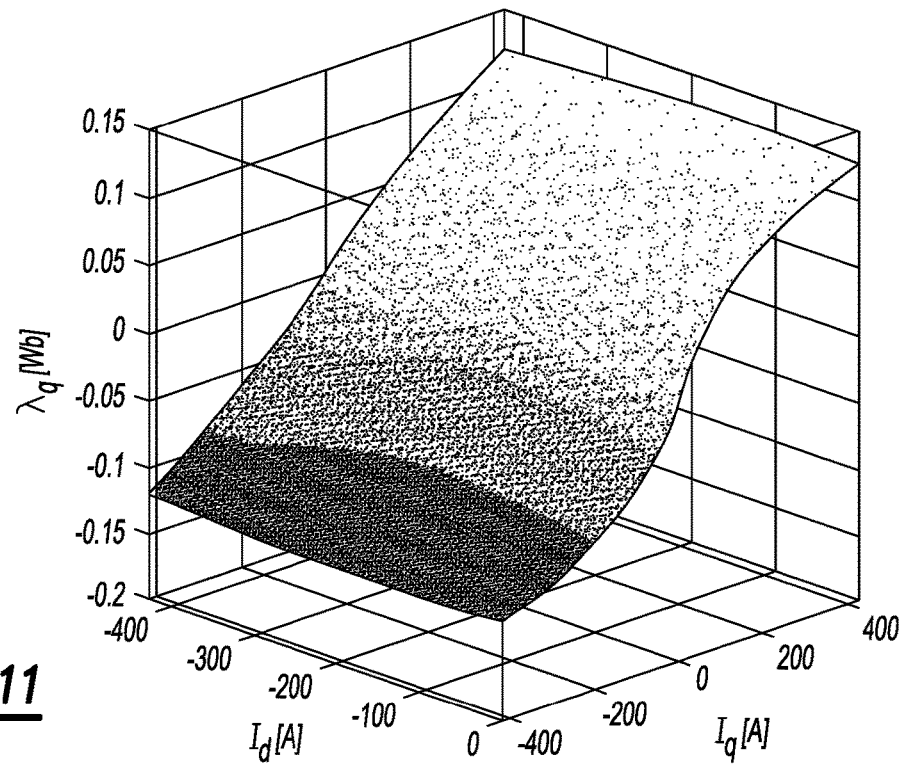

An example of $\lambda_{dq}(I_d, I_q, T)$ flux maps is shown in FIGS. 10 and 11 where the depicted contour represents the depicted change in the values, and generally indicates that flux is a function of the d-axis and q-axis currents, i.e., $I_d$ and $I_q$, respectively. Effects of temperature T can be additionally compensated.

An example of the $\lambda_{dqHx}(I_d, I_q, Hxn\theta_e, T)$ term is represented as of function of electrical angle $Hxn\theta_e$ with Hxn=6, implying a $6^{th}$ order harmonic at different torques implying different $I_d$, $I_q$ currents. Effects due to variation of temperature can be additionally compensated instead of a lookup table. Similarly, incremental and mutual inductances and apparent inductances that are discussed so far can be broken down into fundamental and harmonic components. Following is the generalized representation of all inductances discussed so far:

$$L(I_d, I_q, \theta_m, T) = L(I_d, I_q, T) + L_{Hx}(I_d, I_q, Hxn\theta_e, T), \quad (18)$$

$$\text{where } L_{Hx} = \begin{bmatrix} \sum_{Hxn=6,12..} L_d \sin(Hxn\theta - \phi) \\ \sum_{Hxn=6,12..} L_d \cos(Hxn\theta - \phi) \end{bmatrix}$$

Figure 5:
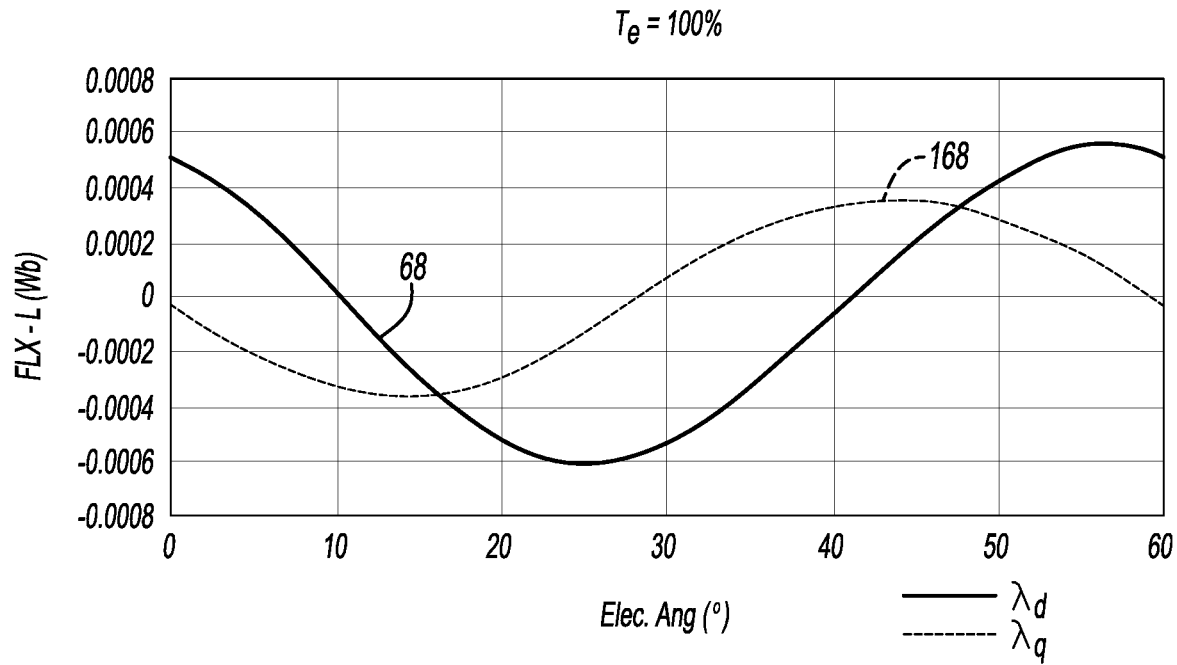
FIGS. 5 and 6 are plots of flux linkage (vertical axis) versus electrical angle (horizontal axis) describing an aspect of the disclosure providing operational point variation of injection phase angle.
Figure 6:
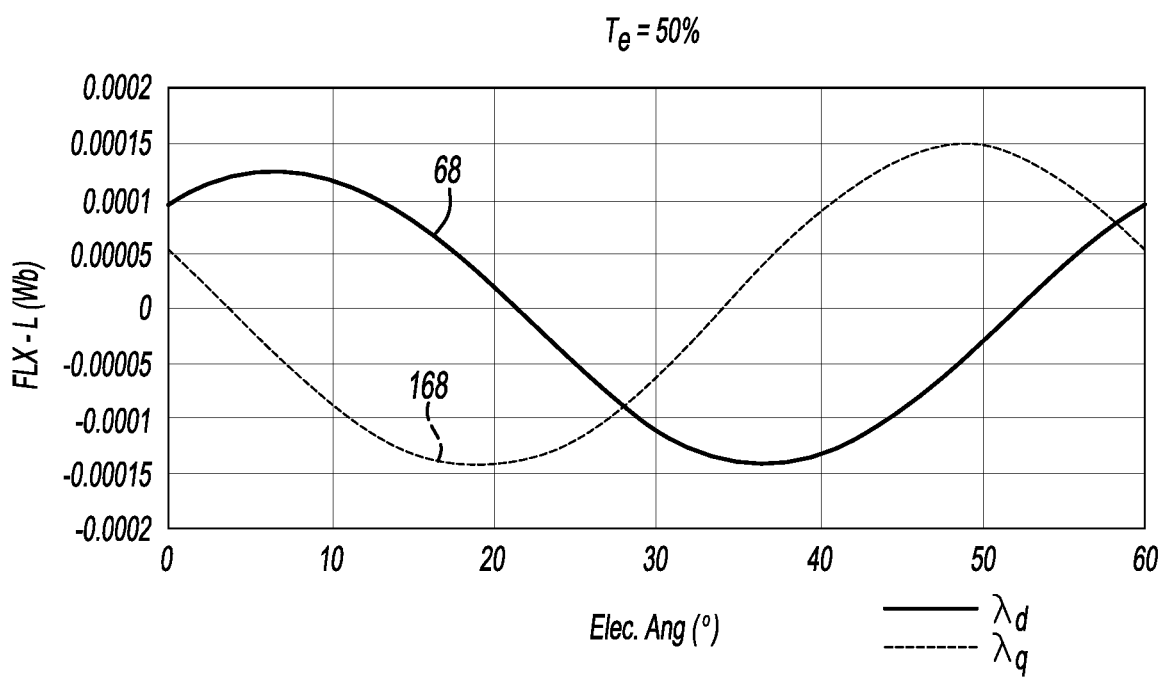

The fundamental component of apparent and incremental inductance terms discussed so far can be obtained using three-axis surface flux maps of the type shown in FIGS. 10 and 11, i.e., with respective d-axis flux ($\lambda_d$) and q-axis flux ($\lambda_q$) components varying as a function of d-axis and q-axis currents ($I_d$ and $I_q$). The harmonic component of apparent and incremental inductance can be obtained using the relationship between flux and current its variation with respect to $Hxn\theta_e$ as shown in FIGS. 5 and 6. FIGS. 5 and 6 show the variation of flux as a function of $Hxn\theta_e$ at different loads implying that they are also a function of d-axis and q-axis currents ($I_d$ and $I_q$).

From the electrical and mechanical power relationship, an electric motor torque $T_e$ equation can be derived as the following which captures the effect of spatial harmonics. The first term gives the average torque, while the second term represents the torque ripple produced by spatial harmonics:

$$T_e = \frac{3P}{2}[\lambda_d(I_d, I_q, T)I_q - \lambda_q(I_d, I_q, T)I_d] + \frac{3}{2}\left[\frac{\partial \lambda_q(I_d, I_q, Hxn\theta_e, T)}{\partial Hxn\theta_e}I_q + \frac{\partial \lambda_d(I_d, I_q, Hxn\theta_e, T)}{\partial Hxn\theta_e}I_d\right] \quad (19)$$

An objective of the controller 50 of FIG. 1 as described herein is to obtain the motor torque ($T_e$) and reduce the torque ripple component as described in equation (19). This may be obtained by controlling the currents described in equation (20) as set forth blow. Alternatively, the controller 50 may be configured to reject current ripple ($I_{dqHx}$) inherent to the electric machine 14 of FIG. 1 due to spatial harmonics and inverter non-linearities such as deadtime, etc., by commanding a zero $I_{dqHx}$ from logic block 63 of FIG. 3. The controller 50 may be optionally configured to address specific harmonics or multiple different harmonics:

$$I_{dq} = I_{dq0} + I_{dqHx}, \quad (20)$$

$$\text{where } I_{dqHx} = \begin{bmatrix} I_{dHx} \\ I_{qHx} \end{bmatrix} = \begin{bmatrix} \sum_{Hxn=6,12..} \lambda_{dN} \sin(Hxn\theta - \phi) \\ \sum_{Hxn=6,12..} \lambda_{qN} \cos(Hxn\theta - \phi) \end{bmatrix}$$

A representative design of a bandwidth-partitioning current regulator, i.e., the harmonic compensation regulator (HC-REG) logic block 36, is thus depicted in FIG. 4. Similar to how the electrical currents and magnetic flux are broken down into a fundamental component and harmonic components as represented above in equations (17) and (20), current regulators may also be designed to control fundamental component and harmonic components:

$$\text{Current Regulation} = G_c(s) + \sum_{n=1,3,6,12..} G_{cHxn}(s)$$

where $G_c(s)$ is a synchronous reference frame current regulator, e.g., logic block 34 of FIG. 4, intended to control the fundamental component, and $G_{cHxn}(s)$ is the harmonic reference frame controller(s), e.g., the bandwidth-partitioning harmonic compensation regulator 31, designed to control the harmonic components, where once again Hxn can be an $n^{th}$ order harmonic.

The voltage equations described in above-specified equations (15) and (16) can then be written in a complex vector form $f_{dq}=f_d+jf_q$ as the following:

$$V_{dq} = RI_{dq} + L_{dqm,inc}\frac{dI_{dq}(t)}{dt} + j\omega_e L_{dq,app}I_{dq}(t) \quad (21)$$

where $L_{dq,app}$ is the apparent inductance term in vector form obtained from equations (11) and (12). $L_{dqm,inc}$ is the incremental inductance matrix given by:

$$L_{dqm,inc} = \begin{bmatrix} L_{dd,inc}(I_d, I_q, \theta_e, T) & L_{qd,inc}(I_d, I_q, \theta_e, T) \\ L_{dq,inc}(I_d, I_q, \theta_e, T) & L_{qq,inc}(I_d, I_q, \theta_e, T) \end{bmatrix} \quad (22)$$

The back-electromotive force term $\omega_e \lambda_m$ may be intentionally ignored, as it is viewed as disturbance term for the controller 50 of FIG. 1, and thus can be compensated as additional term in the controller 50.

Equation (22) may be transformed into the Laplace domain (or s-domain), and the plant representation of the electric machine 14 in the current domain $G_p(s)$ may be defined as:

$$G_p(s) = \frac{I_{dq}(s)}{V_{dq}(s)} = \frac{\frac{1}{L_{dqm,inc}}}{s + \frac{R+R_{damp}}{L_{dqm,inc}} + \frac{j\omega_e L_{dq,app}}{L_{dqm,inc}}} \quad (23)$$

Here, $R_{damp}$ is the damping resistance added to improve the dynamics of the system. The fundamental component controller $G_c(S)$ is designed to control the damped plant $G_p(s)$ so that the actual electric machine 14 of FIG. 1 behaves like a well-damped plant $G_p(s)$. $G_c(s)$ can be defined as:

$$G_c(s) = \frac{V_{dq}(s)}{I_{dq}^*(s) - I_{dq}(s)} = K_{pdq} + \frac{K_{idq} + j\omega_e K_{ppdq}}{s} \quad (24)$$

The gains $K_{pdq}$ and $K_{idq}$ may be set to achieve approximate pole-zero cancellation, $\omega_{bf} = 2\pi f_b$ [$F_s$], where $\omega_{bf}$ is the bandwidth of the synchronous frame current regulator, and $F_s$ is the sampling frequency.

Bandwidth is varied either linearly or other as a function of sampling frequency to maintain high bandwidth and disturbance rejection properties of the system, i.e., the electric machine 14. That is, $K_{pdq}=\omega_b L_{dqm,inc}(I_d, I_q, T)$, where $L_{dqm,inc}$ can be obtained without comprehending the variation due to angular position $\theta_e$, as $G_c(s)$ is configured to control the fundamental component. As represented in equation (18), the inductance terms can be broken down into fundamental and harmonic components. $K_{idq}=\omega_b(R+R_{damp}$ [$F_s$]), where $R_{damp}$ is modified as a function of sampling frequency to maintain high bandwidth and disturbance rejection properties. As discussed with reference to equation (18), the inductance terms can be broken down into fundamental and harmonic components.

Continuing with this discussion, the synchronous reference frame frequency response is an approximate first order response with bandwidth $\omega_b$:

$$\frac{I_{dq}(s)}{I_{dq}^*(s)} = \frac{s}{1} \frac{G_c(s)G_{pc}(s)}{1+G_c(s)G_{pc}(s)} \approx \frac{\omega_{bf}}{s+\omega_{bf}} \quad (25)$$

The synchronous current regulator can be rotated into the harmonic reference frame of a specific harmonic Hxn, which leads to:

$$G_{cHx}(s) = \quad (26)$$
$$K_{pdq} + \frac{K_{idq} + j\omega_e K_{ppdq}}{s - jH_{xn}\omega_e} + K_{pdq} + \frac{K_{idq} - j\omega_e K_{ppdq}}{s+jH_{xn}\theta_e} \approx \frac{s(K_p s + K_i)}{s^2 + (jH_{xn}\omega_e)^2}$$

The gains are then set as the following in an attempt to achieve approximate pole-zero cancellation, $\omega_{bn} = BW_{nscale}\omega_{bf}$, where $BW_{nscale}$ is a scaling value use to set the bandwidth of harmonic reference frame controllers as a function of synchronous reference frame controller 50. Thus, $K_{pdq,Hxn}=\omega_b L_{dqm,inc}(I_d, I_q, H_{xn}\theta_e, T)$, where $L_{dqm,inc}$ can be obtained from equation (24) without the fundamental component, as discussed with reference to equation (18).

The inductance terms can be broken down into fundamental and harmonic components. $K_{idq,Hxn}=\omega_b(R+R_{damp}$ [$F_s$]), where $R_{damp}$ modified as a function of sampling frequency to maintain high bandwidth and disturbance rejection properties of the system.

The effective decoupled plant of equation (23) can thus be defined as:

$$G_{pDcpl}(s) = \frac{I_{dq}(s)}{V_{dq}(s)} = \frac{\frac{1}{L_{dqm,inc}}}{s + \frac{R}{L_{dqm,inc}}} \quad (27)$$

This expression leads to harmonic reference frame frequency response, which is a bandpass system response centered around $H_{xn}$:

$$\frac{I_{dqHx}(s)}{I_{dqHx}^*(s)} = \frac{s}{s} \frac{G_{cHx}(s)G_{pDcpl}(s)}{1+G_{cHx}(s)G_{pDcpl}(s)} \approx \frac{\omega_{bn}s}{s^2+\omega_{bn}s+(H_{xn}\omega_e)^2} \quad (28)$$

A discrete form of equation (24) noted above can be implemented for FIG. 4 (logic block 34) by applying $$s = \frac{T_s z}{z-1}.$$

A discrete form of equation (26) is depicted in FIG. 4, with a frequency correction term $f(\omega_e, Hxn, T_s)$ used to account for discretization error and sampling delay typical to digital control systems such as the controller 60, which can be pre-configured using a look table. $T_s$ (blocks 52) represents the sampling period $$\left(\frac{1}{F_s}\right).$$

In the alternative control logic 250L, additional current-to-flix conversion lookup tables 170 and 270 are used to output the fundamental and harmonic flux components, i.e., $\lambda_{dq}$ and $\lambda_{dqHxn}$, respectively. The configuration of FIG. 8 may use the alternative configuration 136 of the harmonic current regulator logic block 36 described above with reference to FIG. 4, as set forth below.

Figure 8:
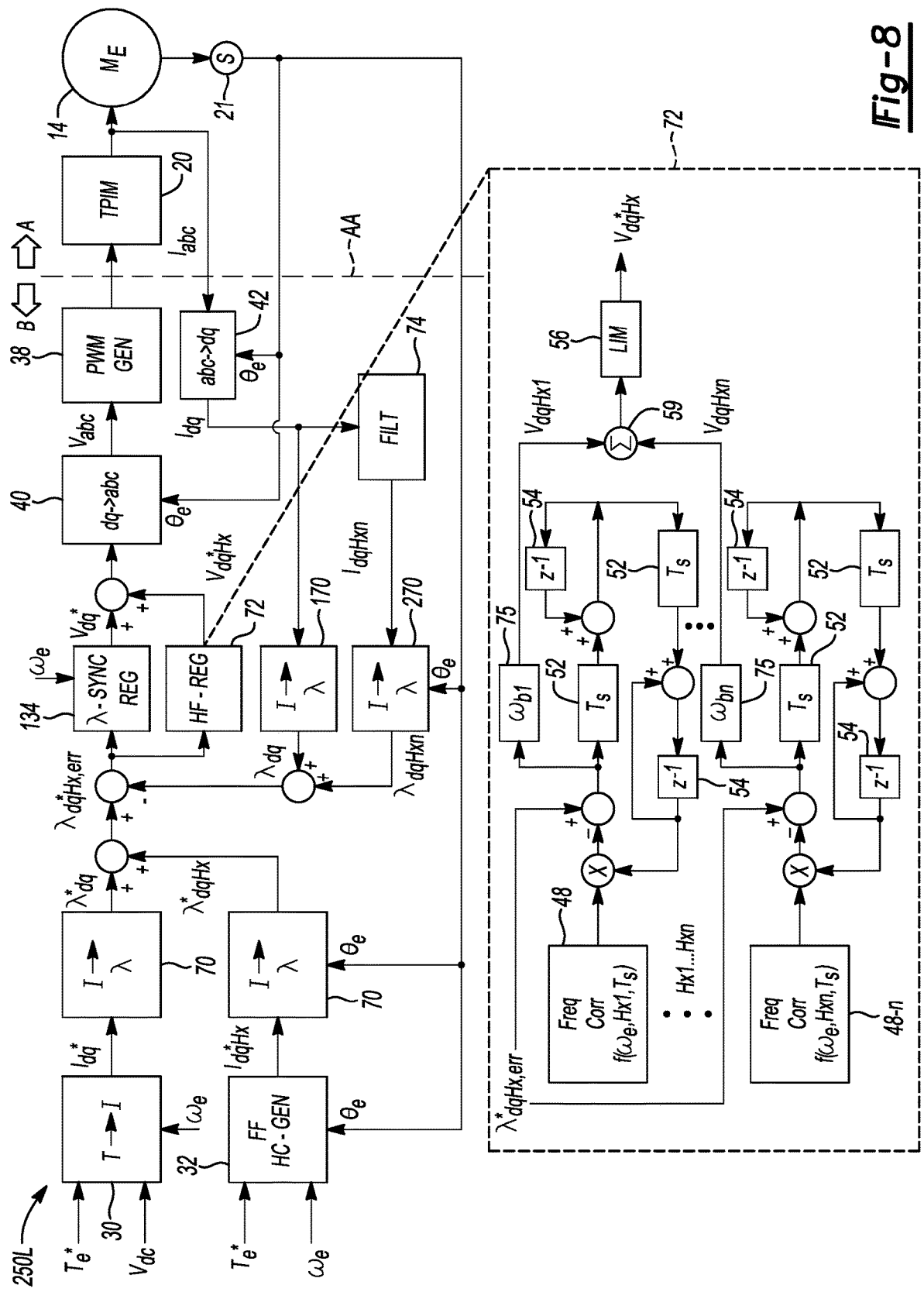
FIG. 8 is an alternative embodiment of the FIG. 7 implementation in which harmonic and fundamental components are controlled in the flux domain.

Such gain configuration in FIG. 8 allows for high bandwidth and high disturbance rejection properties while maintaining the system stability up to low pulse ratios $$\left(\frac{F_s}{Hxn * F_e} \approx 6\right),$$

where $F_e$ is synchronous frequency proportional to the rotational speed $\omega_e$, and "low pulse ratio" implies operating at a high frequency or speed for a given sampling frequency. Also, this type of gain configuration comprehends the variation of flux $\lambda_{dq}$ ($I_d, I_q, Hxn\theta_e, T$) leading to a precise control of high-frequency components.

Bandwidth-partitioning as used herein is therefore an approach to combine controllers with different bandwidths and frequency process objectives allowing the overall control system to achieve high bandwidth and disturbance rejection properties. As an example, the synchronous reference frame current regulator can be configured to have high bandwidth, and it would be responsible for the average or fundamental current commands by achieving average torque. Harmonic reference frame current regulators can be configured to a have a partitioned bandwidth as described herein, and are responsible for tracking high-frequency pulsating signals intended for torque ripple reduction or tone injection or current ripple reduction. This enables improved tracking of high-frequency pulsating signals of multiple orders (harmonics) without any DC component and phase lag errors.

Design of bandwidth-partitioning flux regulators is described in an exemplary embodiment in FIG. 8. Voltage equations from equations (1) and (2) described above can be written in the flux form using the relationship between current and flux from equations (13) and (14):

$$V_d = R\frac{\lambda_d - \lambda_m}{L_{d,app}} + \frac{d\lambda_d}{dt} - \omega_e\lambda_q \quad (29)$$

$$V_q = R\frac{\lambda_q}{L_{q,app}} + \frac{d\lambda_q}{dt} + \omega_e\lambda_d \quad (30)$$

Such equations may be written in complex vector form $f_{dq} = f_d + jf_q$ as:

$$V_{dq} = R\frac{\lambda_{dq}}{L_{dq,app}} + \frac{d\lambda_{dq}}{dt} + j\omega_e\lambda_{dq} \quad (31)$$

Defining time constant $$\tau_{dqi} = \frac{1}{\tau_{dq}} \text{ where } \tau_{dq} = \frac{R}{L_{dq,app}}$$

transformed in to Laplace domain (or s-domain) leads to plant model in flux domain:

$$G_p(s) = \frac{\lambda_{dq}}{V_{dq}} = \frac{1}{s + \tau_{dqi} + j\omega_e} \quad (32)$$

A fundamental flux controller or a synchronous frame flux regulator may be expressed mathematically or defined as:

$$G_c(s) = \frac{V_{dq}}{(\lambda_{dq}^* - \lambda_{dq})} = \omega_{bf}\left(1 + \frac{\tau_{dqi} + j\omega_e}{s}\right) = \frac{\omega_{bf}s + \omega_b j\omega_e}{s} \quad (33)$$

Doing this achieves approximate first order dynamics:

$$\frac{\lambda_{dq}(s)}{\lambda_{dq}^*(s)} = \frac{G_c(s)G_p(s)}{1 + G_c(s)G_p(s)} = \frac{\omega_b}{s + \omega_b}$$

Synchronous flux regulator can be rotated into the harmonic reference frame of a specific harmonic $H_{xn}$, which leads to:

$$G_{cHx}(s) = \qquad (34)$$
$$\omega_{bf}\left(1 + \frac{\tau_{dqi} + j\omega_e}{s - jH_{xn}\omega_e}\right) + \omega_{bf}\left(1 + \frac{\tau_{dqi} - j\omega_e}{s + jH_{xn}\omega_e}\right) = \frac{\omega_{bn}s(s + \tau_{dqi})}{s^2 + (jH_{xn}\omega_e)^2}$$

where $\omega_{bn}$ is the bandwidth of the harmonic flux regulator and is set as $\omega_{bn} = BW_{nscale}\omega_{bf}$, and $BW_{nscale}$ is a scaling value use to set the bandwidth of harmonic reference frame controllers as a function of synchronous reference frame controller, and where $$\tau_{dqiHxn} = \frac{1}{\tau_{dqHx}} \text{ and } \tau_{dqHxn} = \frac{R}{L_{dq,app}(I_d,I_q,H_{xn}\theta_e,T)}.$$

Harmonic flux regulators are typically used for injecting a small magnitude of high frequency signals and $\tau_{dqi}$ is typically small enough for this case and can be ignored if required:

$$G_{cHx,mod}(s) = \frac{\omega_{bn}s^2}{s^2 + (jH_{xn}\omega_e)^2} \quad (35)$$

An effective decoupled plant of equation (32) can be written as:

$$G_{pDcpl}(s) = \frac{\lambda_{dq}}{V_{dq}} = \frac{1}{s + \tau_{dqi}}$$

This leads to harmonic reference frame frequency response, which is a bandpass system response centered around $H_{xn}$:

$$\frac{\lambda_{dqHx}(s)}{\lambda_{dqHx}^*(s)} = \frac{G_{cHx}(s)G_{pHx}(s)}{1 + G_{cHx}(s)G_{pHx}(s)} \approx \frac{\omega_{bn}s}{s^2 + \omega_{bn}s + (H_{xn}\omega_e)^2} \quad (36)$$

A discrete form of the above-noted equation (33) for the synchronous flux regulator can be implemented for FIG. 8 by applying $$s = \frac{T_s z}{z - 1}.$$

Likewise, a discrete form of equation (35) is described in FIG. 8 with a frequency correction term $f(\omega_e, H_{xn}, T_s)$ to account for discretization errors and sampling delays in the typical digital control system, which can be preconfigured using a look table, with $T_s$ being the sampling period $$\left(\frac{1}{F_s}\right).$$

Figure 9:
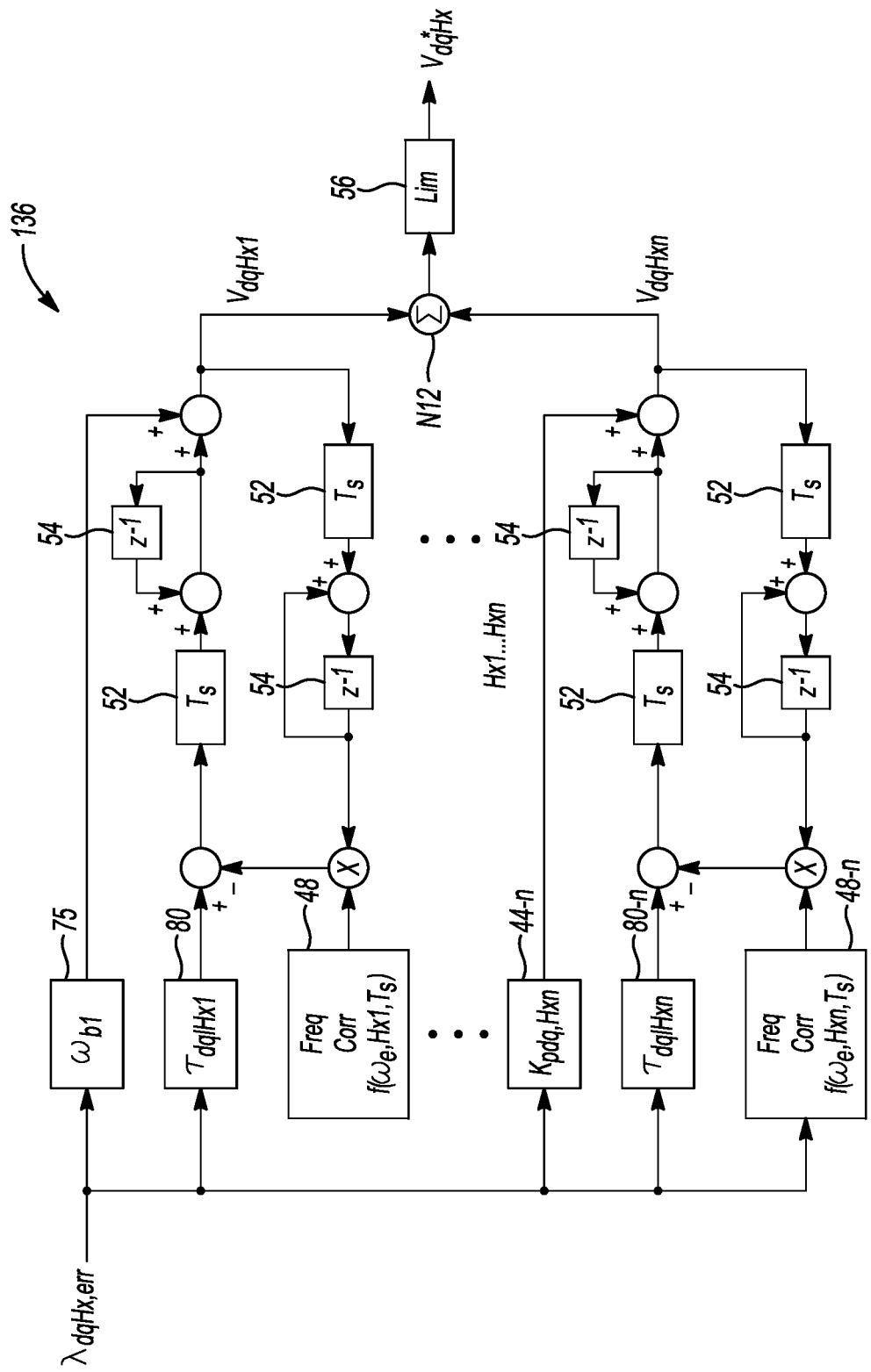
FIG. 9 is an alternative bandwidth-partitioning harmonic current regulator logic block usable with the configuration of FIG. 8.

A discrete form of equation (34) including the time constant term is described in FIG. 9. One of the distinct advantages of the controlling an AC electric machine such as the electric machine 14 of FIG. 1 in the flux domain per FIG. 8 instead of the current domain of FIG. 7 is that one may account for the cross-coupling and saturation effects resulting in a more precise level of control.

Figure 7:
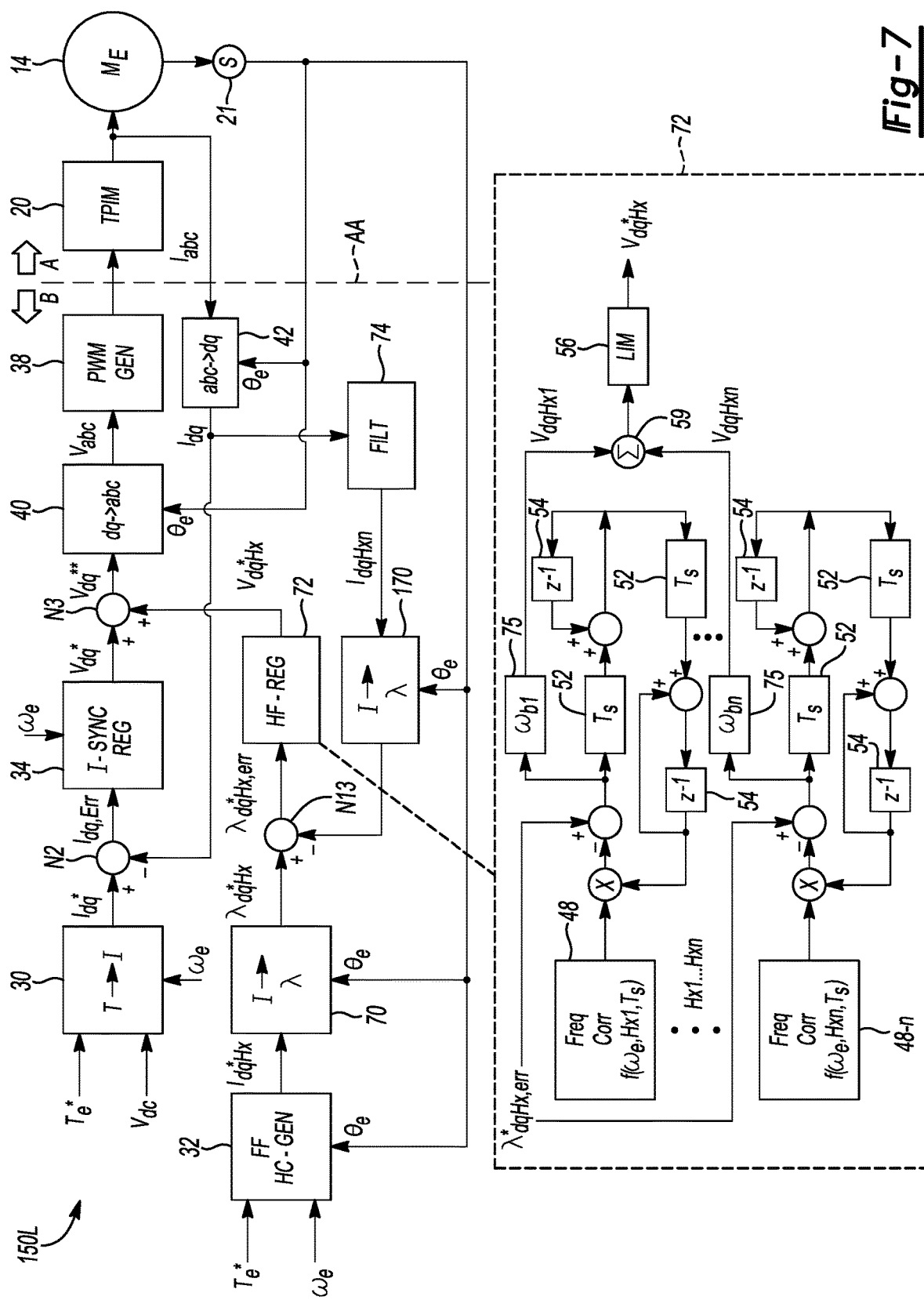
FIG. 7 is an alternative embodiment of the FIG. 2 implementation in which harmonic components are controlled in the flux domain and the fundamental components are controlled in the current domain.

In FIG. 7 by comparison, harmonic components are controlled in the flux domain and the fundamental components are controlled in current domain. This alternative control scheme remains an effective option, as variation of harmonic reference frame flux is accounted for.

Returning briefly to FIG. 4, by using the PI control logic implementation the harmonic current regulator may be partitioned by bandwidth (BW1, . . . , BWn), e.g., within one sub-block 36 used for each of (n) harmonic components, with corresponding blocks 44-$n$, 46-$n$, and 48-$n$ as shown. The outputs of each sub-block 36, . . . , 36-$n$ are then summed at node N12 and limited at block 56 provide the harmonic compensation voltage component ($V_{dq\ Hx}^*$) to summation node N3, as shown in FIG. 2 and described above.

FIGS. 5 and 6 noted above illustrate effects on flux magnitude and phase for a given torque load, e.g. 100% torque load (FIG. 5) and 50% torque load (FIG. 6). Flux linkage (FLX-L) in Webers (Wb) is depicted on the vertical axis for d-axis flux and q-axis flux contributions 68 and 168, respectively. Electrical angle (Elec. Ang.) in degrees (°) is depicted the horizontal axis. A comparison of FIGS. 5 and 6 reveals that flux linkage varies as a function of electrical angle and torque load. This renders the electric drive system 11 of FIG. 1 sensitive to a purposefully-injected current and phase angle of the present disclosure, and likewise to the contemplated operating point-based bandwidth-partitioned variation of phase angle injection.

Selective Acoustic Tone Injection: as noted above, in some applications such as a battery electric vehicle embodiment of the motor vehicle 10 shown in FIG. 1, it may be difficult due to configuration of the electric machine 14 and powerline dynamics to completely eliminate a given harmonic order, or it may be desirable to retain a given harmonic order. Thus, in the mechanical domain the described bandwidth portioning approach enables introduction of an audible tone, for instance a $1^{st}$ or $3^{rd}$ order harmonic, to distract a user from sounds emanating at another perhaps higher order harmonic, e.g., a $6^{th}$ or $12^{th}$ order harmonic. Likewise, introducing a tone may complement other harmonic orders that may be produced during operation of the electric machine 14. In this manner, the present teachings are not limited to cancelling undesirable harmonics, but may also or alternatively include purposefully injecting harmonics to shape the NVH characteristics of the electric drive system 11. Therefore, tone injection may be performed in addition to or instead of noise reduction and cancellation of torque and current ripple.

FIG. 7 depicts control logic 150L that may be used as a variation or extension of the current-based approach of FIG. 2. That is, in lieu of processing in the current domain, the present teachings may be applied in the flux domain. As will be appreciated, operation in the flux domain requires accurate knowledge of the d-axis and q-axis flux properties of the electric machine 14 across its intended operating range. Such information may be determined, e.g., via offline testing and calibration, and then recorded in memory (M) of the controller 50 shown in FIG. 1.

Relative to FIG. 2, the modified flux domain-based control logic 150L includes current-to-flux mapping lookup tables 70 and 170 ("I→λ") and the harmonic flux regulator logic block 72 ("HF-REG"), as well as a filter 74 ("FILT"), e.g., a bandpass filter or a synchronous filter. Lookup table 70 provides, for a given harmonic compensation current component ($I_{dq\ Hx}^*$), a corresponding commanded harmonic compensation flux component ($\lambda_{dq\ Hx}^*$). From this value is subtracted, at node N13, an actual or estimated harmonic compensation flux component ($\lambda_{dq}$Hxn) from the bandpass filter 74, with the difference being a flux error signal (arrow $\lambda_{dq^*Hx,\ err}$). This error signal is then provided as an input to the harmonic flux regulator logic bock 72 along with the current rotary speed ($\omega_e$).

Logic block 72 is shown in further detail in FIG. 7 using a discrete control topology similar in respects to that which is depicted in FIG. 4, apart from the proportional and integral gain blocks 44 and 46 of FIG. 4. Frequency correction block 48, likewise shown in FIG. 4, provides a correction value as a function of rotary speed $\omega_e$, the particular harmonic (Hx1), and the time domain parameter (Ts). In addition to the above-described integrator blocks ($z^{-1}$) 54 and sampling intervals (Ts) 52, the control logic 150L include gain blocks 75 ("$\omega_{b1}$", . . . , "$\omega_{bn}$"), where $\omega_{bn}=2\pi f_{bn}(F_{sw})$. Here, $\omega_{bn}$ is the bandwidth of the harmonic flux regulator logic block 72 in radians per second, where (n) once again is applicable to particular harmonic frequency as noted elsewhere above. $F_{bn}$ is the bandwidth of the harmonic flux regulator in Hertz, and $F_{sw}$ is the switching frequency of the TPIM 20 (FIGS. 1 and 2), e.g., the sampling frequency of controller 50. The bandwidth is thus varied as a function of the switching frequency, either linearly or otherwise. An advantage of this approach is that stability of harmonic current regulation is ensured over different switching and sampling frequencies. Thus, the harmonic compensation current component ($V_{dq\ Hx}^*$) is output from the limiting block 56 to node N3 of FIG. 2.

The present teachings lend themselves to implementation of an associated control method, as will be readily appreciated by those having ordinary skill in the art. In an exemplary embodiment, for instance, the controller 50 of FIG. 1 may evaluate the above-described enabling conditions to determine whether implementation of the torque and current ripple cancellation techniques is warranted. When the enabling conditions are satisfied, the controller 50 may identify the particular harmonic component(s) to address, e.g., the $3^{rd}$, $6^{th}$, and/or $12^{th}$ harmonic component.

The controller 50 then determines, as a function of rotational speed and motor torque, the required d-axis and q-axis current commands and a phase injection needed to cancel current and torque ripple, and possibly to inject or introduce an audible tone for a selected harmonic. As part of such an approach, the controller 50 may scale the harmonic current commands as a function of motor speed and then sum the various harmonic current commands. The controller 50 ultimately generates the required phase voltage commands for energizing the electric machine 14 after engaging bandwidth partitioning of synchronous and harmonic current regulator 36 (FIG. 2).

Offline, the present method may include determining the required values for populating the lookup tables of FIGS. 2, 3, 4, and 7. For instance, on a test stand or laboratory setting, one may determine the current command and phase needed to cancel torque ripple for a select harmonic of the electric machine 14. As part of such an effort, the underlying plant may be modeled and characterized, with the plant in this instance including the electric machine 14 and a coupled load. NVH analysis may be performed at different torque loads and rotary speeds of the electric machine 14. A similar approach may be used for tone injection for select harmonics. Thereafter, the controller 50 in operation generates harmonic current commands and phase commands in real time to cancel torque ripple and current ripple, as well as to reduce acoustic noise in the electric drive system 11 of FIG. 1.

In a non-limiting exemplary application of the present teachings, a user may separately configure treatment of two harmonic orders, e.g., Hx1=6 and Hx2=12, and selectively enable the control logic 50L or 150L for Hx1 and Hx2 for a respective torque and speed operating region. For harmonic order Hx1, torque ripple may be cancelled for a given torque and speed operating region by configuring current magnitude and phase blocking. The zero-command generation logic block 63 of FIG. 3 may be configured to cancel current ripple for the specific Hx1 torque and speed operating region. By commanding zero for a configured region, the controller tries to force the plant's currents to be zero for a particular harmonic by commanding the compensating voltage, i.e., $V_{qHx}$. At the same time, a magnitude and phase block for Hx2 may be configured to inject an acoustic tone to distract low-frequency content of the harmonic order Hx1. Alternatively, one could configure treatment of the harmonic orders Hx1 and Hx2 to cancel torque and current ripple for select torque and speed regions.

Figure 12:
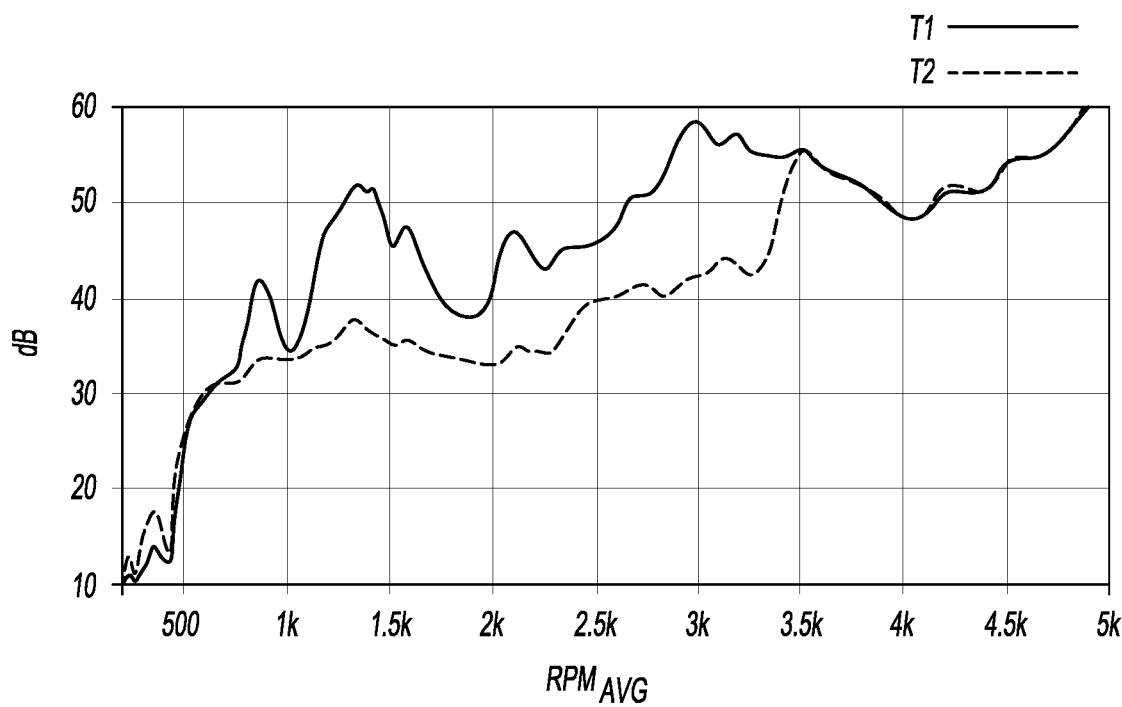
FIGS. 12 and 13 are representative plots of vibration reduction and noise reduction, respectively, relative to baseline levels.
Figure 13:
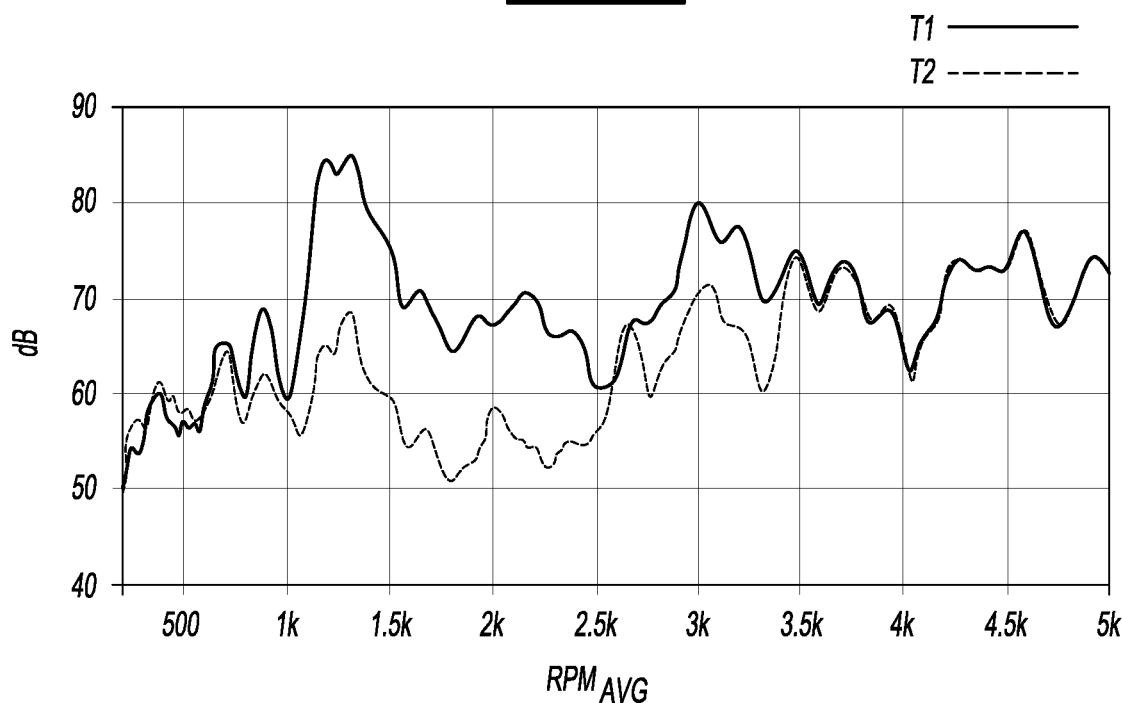

FIGS. 12 and 13 respectively depict possible vibration reduction and acoustic noise reduction, respectively, for baseline acceleration. Average speed of the electric machine 14 in revolutions-per-minute ($RPM_{AVG}$) is depicted on the horizontal axis, with decibels (dB) depicted on the vertical axis. Trace T1 forms the baseline performance absent the present teachings for such a representative acceleration, with trace T2 representing the performance under the same conditions using the disclosed harmonic-partitioning strategy. Typical of the present benefits is a reduction in vibration and acoustic noise at higher rotational speeds, e.g., at above about 1000 RPM in this example case, which corresponds to speed ranges not typically addressed in a harmonic sense using conventional approaches.

While the present teachings are represented as corresponding control logic and constituent logic blocks, those skilled in the art will recognize herein an underlying method for controlling operation of the rotary electric machine 14. Thus, instructions 100 of FIG. 1 may be encoded such that execution of the instructions 100 by the processor(s) P of the controller 50 cause the controller 50 to receive, via the harmonic compensation regulator 31 of FIG. 2, the commanded torque ($T_e^*$) and the rotary speed ($\omega_e$) of the electric machine 14, and then calculating, via the harmonic compensation regulator 31 in response to the set of enabling conditions (arrow $CC_{ENBL}$), a dq harmonic compensation current ($I_{dqHx}^*$) and voltage ($V_{dqHx}^*$) for one or more predetermined harmonic orders using the commanded torque ($T_e^*$) and the rotary speed ($\omega_e$). As noted above, the harmonic compensation current voltage is configured to cancel torque and current ripple in the predetermined harmonic order(s).

The method may include adding the dq harmonic compensation current ($I_{dqHx}^*$) and voltage ($V_{dqHx}^*$) to the dq current and voltage commands ($I_{dq}^*$ and $V_{dq}^*$) respectively, to generate an adjusted dq current command ($I_{dq}^{}$) and an adjusted dq voltage command ($V_{dq}^{}$). The method thereafter may include controlling operation of the electric machine 14 of FIG. 1 using the adjusted dq current and voltage commands ($I_{dq}^{}$ and $V_{dq}^{}$).

Such a method may treat multiple harmonic orders, in which case the bandwidth-partitioning harmonic compensation regulator 31 of FIG. 2 may be configured to add together the dq harmonic compensation currents ($I_{dqHx}^*$), . . . , ($I_{dqHn}^*$) for each of the multiple harmonic orders, and to likewise to add together the dq harmonic compensation voltages ($V_{dqHx}^*$), . . . , ($V_{dqHn}^*$) for each of the multiple harmonic orders to generate the harmonic compensation current and voltage ($I_{dqHx}^*$) and ($V_{dqHx}^*$), respectively.

Embodiments of the method may include generating the dq current command ($I_{dq}^*$) via the torque-to-current logic block 30 of the controller 50 depicted in FIG. 2 as a function of the commanded torque ($T_e^*$), the rotary speed ($\omega_e$), and the DC bus voltage level ($V_{dc}$). Logic block 30, as noted above, may be implemented as a lookup table indexed or referenced by the commanded torque, rotary speed, and the DC bus voltage level.

Other aspects of the method may include subtracting the actual dq current ($I_{dq}$) of the electric machine 14 from the adjusted dq current command ($I_{dq}^{}$) to derive the dq current error value ($I_{dq,Err}$), generating the adjusted dq voltage command ($V_{dq}^{}$) via the harmonic compensation regulator 31 using the dq current error value ($I_{dq,Err}$), converting the adjusted dq voltage command ($V_{dq}^{**}$) into phase voltage commands ($V_{abc}^*$), and providing the phase voltage commands ($V_{abc}^*$) to the TPIM 20 of FIGS. 1 and 2 to thereby energize the electric machine 14.

In the illustrated FIG. 2 embodiment, the method may include determining and outputting the dq harmonic compensation current ($I_{dqHx}^*$) via the FF HC-GEN logic block 32, determining and outputting the dq harmonic compensation voltage ($V_{dqHx}^*$) via the HC-REG logic block 36, and ramping the dq harmonic compensation current ($I_{dqHx}^*$) via the scaling logic block(s) 60, . . . , 60-n of the FF HC-GEN logic block 32 as shown in FIG. 3. The method may entail selectively zeroing the separate d-axis and q-axis harmonic compensation currents ($I_{dHx1}$, . . . , $I_{dHxn}$ and $I_{qHx1}$, . . . , $I_{qHxn}$) via the null block as a function of the commanded torque and the rotational speed.

As shown in FIG. 4, the HC-REG logic block 36 of FIG. 2 may include multiple separate control loops for each corresponding one of the harmonic orders, with each of the loops having selectable proportional and integral gain blocks 44 and 46, and a frequency correction block 48. Determining and outputting the dq harmonic compensation voltage ($V_{dqHx}^*$) via the HC-REG logic block 36 may include calculating a respective harmonic-specific dq harmonic compensation voltage for each of the (n) harmonic orders, and then adding together the respective harmonic-specific dq harmonic compensation voltages ($V_{dqHx}^*$) to thereby generate the commanded dq harmonic compensation voltage ($V_{dqHx}^*$).

Also as noted above, an audible tone may be injected at predetermined harmonic order using the harmonic compensation regulator 31 of FIG. 2, with the regulator 31 also operating, in an alternative embodiment, in the magnetic flux domain instead of the current domain. In the flux domain, the method may be adapted to include translating the dq harmonic compensation current ($I_{dqHx}^*$) from the FF HC-GEN logic block 32 of FIG. 7 into a dq harmonic compensation flux ($\lambda_{dgHx}^*$), calculating the dq harmonic compensation flux error value ($\lambda_{dqHx,err}^*$), transmitting the dq harmonic compensation flux error value ($\lambda_{dqHx,err}^*$) to the HF-REG logic block 72 of FIG. 7, and then determining and outputting the dq harmonic compensation voltage ($V_{dqHx}^*$) via the HC-REG logic block 72 using the dq harmonic compensation flux error value ($\lambda_{dqHx,err}^*$), e.g., using the assistance of a lookup table, calculation, or other implementation.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A method for controlling operation of a rotary electric machine, the method comprising:
   receiving a commanded torque and a rotational speed of the electric machine via a bandwidth-partitioning harmonic compensation regulator (HCR) of a controller;
   calculating, via the HCR in response to a set of enabling conditions, a dq harmonic compensation current and a dq harmonic compensation voltage for one or more predetermined harmonic orders using the commanded torque and the rotational speed, wherein the harmonic compensation current and a harmonic compensation voltage are configured to selectively cancel torque ripple and current ripple in the one or more predetermined harmonic orders;
   adding the dq harmonic compensation current and the dq harmonic compensation voltage to a dq current command and a dq voltage command, respectively, to generate an adjusted dq current command and an adjusted dq voltage command; and
   controlling operation of the electric machine using the adjusted dq current command and the adjusted dq voltage command, including one or more of cancelling the torque ripple and the current ripple in the one or more predetermined harmonic orders.

2. The method of claim 1, wherein the one or more predetermined harmonic orders includes multiple harmonic orders, and wherein the HCR is configured to add together the dq harmonic compensation current and the dq harmonic compensation voltage for each of the multiple harmonic orders to thereby generate the harmonic compensation current and the harmonic compensation voltage, respectively.

3. The method of claim 1, wherein the electric machine is connected to a direct current (DC) voltage bus having a DC bus voltage level, the method further comprising generating the dq current command using a torque-to-current logic block of the controller as a function of the commanded torque, the rotational speed, and the DC bus voltage level.

4. The method of claim 3, wherein the torque-to-current logic block is a lookup table indexed or referenced by the commanded torque, the rotational speed, and the DC bus voltage level.

5. The method of claim 1, wherein the electric machine is connected to a traction power inverter module (TPIM), the method further comprising:
   subtracting an actual dq current of the electric machine from the adjusted dq current command to derive a dq current error value;
   generating the adjusted dq voltage command via the HCR logic block using the dq current error value;
   converting the adjusted dq voltage command into phase current commands; and
   providing the phase current commands to the TPIM to thereby energize the electric machine.

6. The method of claim 1, wherein the HCR includes a feed-forward harmonic current generation logic block (FF HC-GEN) logic block and a harmonic current regulator (HC-REG) logic block, the method comprising:

determining and outputting the dq harmonic compensation current via the HC-REG logic block; and
   determining and outputting the dq harmonic compensation voltage via the HC-REG logic block; and
   ramping the dq harmonic compensation current via a scaling block of the FF HC-GEN logic block.

7. The method of claim 6, wherein the FF HC-GEN logic block includes a current magnitude lookup table configured to provide separate d-axis and q-axis harmonic compensation currents, and a phase injection lookup table configured to output a harmonic compensation phase adjustment.

8. The method of claim 7, wherein the FF HC-GEN logic block includes a null or zero block, the method comprising selectively nulling or zeroing the separate d-axis and q-axis harmonic compensation currents via the null or zero block as a function of the commanded torque and the rotational speed.

9. The method of claim 6, wherein the HC-REG logic block includes multiple separate control loops for each corresponding one of the harmonic orders, each of the loops having selectable proportional and integral gain blocks and a frequency correction block, wherein determining and outputting the dq harmonic compensation voltage via the HC-REG logic block includes calculating a respective harmonic-specific dq harmonic compensation voltage for each of the harmonic orders, and adding together the respective harmonic-specific dq harmonic compensation voltages to thereby generate the dq harmonic compensation voltage.

10. The method of claim 6, wherein the HCR operates in the magnetic flux domain, the method further comprising:
    translating the dq harmonic compensation current from the FF HC-GEN logic block into a dq harmonic compensation flux;
    calculating a dq harmonic compensation flux error value;
    transmitting the dq harmonic compensation flux error value to the HF-REG logic block; and
    determining and outputting the dq harmonic compensation voltage via the HC-REG logic block using the dq harmonic compensation flux error value.

11. The method of claim 1, further comprising selectively injecting an audible tone in a predetermined harmonic order using the HCR.

12. An electric drive system comprising:
    a battery pack;
    a rotary electric machine coupled to a load;
    a traction power inverter module (TPIM) connected to the battery pack and the rotary electric machine; and
    a controller in communication with the TPIM and configured to:
      receive, via a bandwidth-partitioning harmonic compensation regulator (HCR) of the controller, a commanded torque and a rotational speed of the electric machine;
      calculate, via the HCR in response to a set of enabling conditions, a dq harmonic compensation current and a dq harmonic compensation voltage for one or more predetermined harmonic orders using the commanded torque and the rotational speed, wherein the harmonic compensation current and the harmonic compensation voltage are configured to cancel torque ripple and current ripple in the one or more predetermined harmonic orders;
      add the dq harmonic compensation current and the dq harmonic compensation voltage to a dq current command and a dq voltage command, respectively, to generate an adjusted dq current command and an adjusted dq voltage command; and control operation of the electric machine using the adjusted dq current command and the adjusted dq voltage command.

13. The electric drive system of claim 12, wherein the one or more predetermined harmonic orders includes multiple harmonic orders, and wherein the HCR logic block is configured to add together the dq harmonic compensation current for each of the multiple harmonic orders and the dq harmonic compensation voltage for each of the multiple harmonic orders to generate the harmonic compensation current and the harmonic compensation voltage, respectively.

14. The electric drive system of claim 12, wherein the controller is configured to selectively inject an audible tone in a predetermined harmonic order using the HCR logic block.

15. The electric drive system of claim 12, wherein the controller is further configured to:
 subtract an actual dq current of the electric machine from the adjusted dq current command to derive a dq current error value;
 generate the adjusted dq voltage command via the HCR logic block using the dq current error value;
 convert the adjusted dq voltage command into phase current commands; and
 provide the phase current commands to the TPIM to thereby energize the electric machine.

16. The electric drive system of claim 12, wherein the HCR includes a feed-forward harmonic current generation logic block (FF HC-GEN) logic block and a harmonic current regulator (HC-REG) logic block, and the controller is further configured to:
 determine and output the dq harmonic compensation current via the HC-REG logic block;
 determine and output the dq harmonic compensation voltage via the HC-REG logic block; and
 ramp the dq harmonic compensation current via a scaling block of the FF HC-GEN logic block.

17. The electric drive system of claim 16, wherein the FF HC-GEN logic block includes a lookup table configured to provide separate d-axis and q-axis harmonic compensation currents, and a phase injection lookup table configured to provide a harmonic compensation phase adjustment.

18. The electric drive system of claim 17, wherein the FF HC-GEN logic block includes a null or zero block, and the controller is further configured to selectively nullify or zero the separate d-axis and q-axis harmonic compensation currents via the null or zero block as a function of the commanded torque and the rotational speed.

19. The electric drive system of claim 17, wherein the HC-REG logic block includes multiple separate control loops for each corresponding one of the harmonic orders, each of the loops having selectable proportional and integral gain blocks and a frequency correction block, wherein the controller is configured to determine and output the dq harmonic compensation voltage via the HC-REG logic block by calculating a respective harmonic-specific dq harmonic compensation voltage for each of the harmonic orders, and thereafter adding together the respective harmonic-specific dq harmonic compensation voltages to generate the dq harmonic compensation voltage.

20. The electric drive system of claim 17, wherein the HCR operates in the magnetic flux domain, and the controller is further configured to:
 translate the dq harmonic compensation current from the FF HC-GEN logic block into a dq harmonic compensation flux;
 calculate a dq harmonic compensation flux error value;
 transmit the dq harmonic compensation flux error value to the HF-REG logic block; and
 determine and output the dq harmonic compensation voltage via the HC-REG logic block using the dq harmonic compensation flux error value.

* * * * *